(12) United States Patent
Kuo et al.

(10) Patent No.: US 11,635,628 B2
(45) Date of Patent: Apr. 25, 2023

(54) AUGMENTED REALITY DISPLAY SYSTEM AND DISPLAY METHOD THEREOF

(71) Applicants: Industrial Technology Research Institute, Hsinchu (TW); Intellectual Property Innovation Corporation, Hsinchu (TW)

(72) Inventors: Shin-Hong Kuo, New Taipei (TW); Yi-Shou Tsai, Taipei (TW); Yu-Hsiang Tsai, Hsinchu County (TW); Kuo-Ping Chang, Taoyuan (TW); Kuan-Ting Chen, Yunlin County (TW)

(73) Assignees: Industrial Technology Research Institute, Hsinchu (TW); Intellectual Property Innovation Corporation, Taipei (TW)

( * ) Notice: Subject to any disclaimer, the term of this patent is extended or adjusted under 35 U.S.C. 154(b) by 0 days.

(21) Appl. No.: 16/296,258

(22) Filed: Mar. 8, 2019

(65) Prior Publication Data

US 2019/0278092 A1 Sep. 12, 2019

Related U.S. Application Data

(60) Provisional application No. 62/642,613, filed on Mar. 14, 2018, provisional application No. 62/640,578, filed on Mar. 9, 2018.

(51) Int. Cl.
*G02B 27/01* (2006.01)
*G02B 9/12* (2006.01)
(Continued)

(52) U.S. Cl.
CPC ....... *G02B 27/0176* (2013.01); *G02B 3/0037* (2013.01); *G02B 3/0062* (2013.01);
(Continued)

(58) Field of Classification Search
CPC ............ G02B 13/0035; G02B 13/0045; G02B 13/004; G02B 27/0025; G02B 27/0172;
(Continued)

(56) References Cited

U.S. PATENT DOCUMENTS 6,804,066 B1 10/2004 Ha et al.
8,269,652 B2 * 9/2012 Seder ..................... G02B 27/01
340/436

(Continued)

FOREIGN PATENT DOCUMENTS

CN 2278227 4/1998
CN 104321681 1/2015
(Continued)

OTHER PUBLICATIONS

"Office Action of Taiwan Counterpart Application", dated May 22, 2019, pp. 1-7.
(Continued)

*Primary Examiner* — Dismery Mercedes
(74) *Attorney, Agent, or Firm* — JCIPRNET

(57) ABSTRACT

An augmented reality display system including an input unit, an operation processing unit and an output unit is provided. The input unit is configured to obtain an environment information. The operation processing unit is configured to operate and process the environment information provided by the input unit to generate an output information. The output unit is configured to transmit the output information provided by the operation processing unit to a user. The output unit includes at least one display module. The at least one display module includes a transparent display, a first lens having a negative refractive power, a second lens having a negative refractive power and a third lens having a
(Continued)

positive refractive power arranged in sequence from a display side to an eye side. An augmented reality display method is also provided.

20 Claims, 25 Drawing Sheets

(51) Int. Cl.
*G02B 3/00* (2006.01)
*G06T 19/00* (2011.01)
*H04W 4/46* (2018.01)
*G02B 3/08* (2006.01)
*G02B 27/09* (2006.01)

(52) U.S. Cl.
CPC ............... *G02B 3/08* (2013.01); *G02B 9/12* (2013.01); *G02B 27/017* (2013.01); *G02B 27/0172* (2013.01); *G02B 27/095* (2013.01); *G02B 27/0961* (2013.01); *G02B 27/0966* (2013.01); *G06T 19/006* (2013.01); *H04W 4/46* (2018.02)

(58) Field of Classification Search
CPC .. G02B 9/34; G02B 13/0015; G02B 15/1421; G02B 2027/0178; G02B 2027/0123; G02B 27/0176; G02B 27/017; G02B 27/0075; G02B 27/095; G02B 27/0961; G02B 27/0966; G02B 27/0101; G02B 3/08; G02B 3/0037; G02B 3/0062; G02B 23/125; G02B 9/12; G02F 1/294; G02F 1/133526; G06F 3/011; G06F 3/012; G06F 3/147; G06F 3/013; H04W 4/46; G02C 7/022
See application file for complete search history.

(56) References Cited

U.S. PATENT DOCUMENTS

| | | | |
|---|---|---|---|
| 8,872,766 B2 | 10/2014 | Moore et al. | |
| 9,036,096 B2 | 5/2015 | Lee et al. | |
| 10,429,650 B2* | 10/2019 | Tsai | G02B 27/0172 |
| 11,231,612 B2* | 1/2022 | Oh | G06T 19/006 |
| 2010/0254001 A1* | 10/2010 | Jang | H04N 13/346 |
| | | | 359/479 |
| 2012/0287040 A1 | 11/2012 | Moore et al. | |
| 2014/0019005 A1 | 1/2014 | Lee et al. | |
| 2014/0153102 A1* | 6/2014 | Chang | G02B 27/0172 |
| | | | 359/630 |
| 2015/0143234 A1* | 5/2015 | Norris, III | G06F 3/013 |
| | | | 715/256 |
| 2016/0025978 A1* | 1/2016 | Mallinson | G02B 27/0172 |
| | | | 345/8 |
| 2016/0110921 A1* | 4/2016 | Takahashi | G02B 27/0172 |
| | | | 345/633 |
| 2016/0284129 A1* | 9/2016 | Nishizawa | G06F 3/013 |
| 2017/0131762 A1* | 5/2017 | Liang | G06F 3/017 |
| 2017/0171533 A1 | 6/2017 | Benitez et al. | |
| 2017/0219826 A1* | 8/2017 | Haseltine | G06T 19/006 |
| 2017/0219828 A1 | 8/2017 | Tsai et al. | |
| 2017/0248769 A1 | 8/2017 | Stamenov | |
| 2017/0322410 A1* | 11/2017 | Watson | G02B 21/365 |
| 2017/0357092 A1 | 12/2017 | Griffin et al. | |
| 2018/0074497 A1* | 3/2018 | Tsuji | G01C 21/3617 |
| 2018/0144355 A1* | 5/2018 | Holman | G06Q 30/0201 |
| 2018/0196231 A1* | 7/2018 | Bone | G02B 27/0172 |
| 2018/0203240 A1* | 7/2018 | Jones | G02B 27/0179 |
| 2018/0218661 A1 | 8/2018 | Guenter | |
| 2018/0231741 A1* | 8/2018 | Dai | G02B 25/001 |
| 2018/0292660 A1* | 10/2018 | Eastwood | G02B 27/0176 |
| 2019/0101724 A1* | 4/2019 | Chen | G02B 9/34 |
| 2019/0107719 A1* | 4/2019 | Edwin | G09G 3/003 |
| 2019/0179149 A1* | 6/2019 | Curtis | G02B 6/0076 |
| 2019/0265477 A1* | 8/2019 | Perreault | G02B 27/14 |
| 2020/0035205 A1* | 1/2020 | Nishibe | G09G 5/38 |

FOREIGN PATENT DOCUMENTS

| | | |
|---|---|---|
| CN | 104536129 | 4/2015 |
| CN | 105137590 | 12/2015 |
| CN | 105573486 | 5/2016 |
| CN | 106526851 | 3/2017 |
| CN | 106666909 | 5/2017 |
| CN | 106991924 | 7/2017 |
| CN | 107015361 | 8/2017 |
| CN | 104660859 | 10/2017 |
| CN | 104062759 | 1/2018 |
| CN | 105812777 | 2/2018 |
| CN | 106918916 | 2/2018 |
| CN | 107683497 | 2/2018 |
| CN | 107703620 | 2/2018 |
| JP | 2013109050 | 6/2013 |
| TW | 181681 | 4/1992 |
| TW | 201326895 | 7/2013 |
| TW | 201506444 | 2/2015 |
| TW | M504249 | 7/2015 |
| TW | 201626046 | 7/2016 |
| TW | I565971 | 1/2017 |
| TW | I589929 | 7/2017 |
| TW | I597623 | 9/2017 |

OTHER PUBLICATIONS

"Notice of Allowance of Taiwan Related Application No. 107147251", dated May 14, 2019, pp. 1-5.
"Office Action of U.S. Appl. No. 16/296,256", dated Feb. 5, 2020, p. 1-p. 22.
"Office Action of U.S. Appl. No. 16/296,256", dated Aug. 10, 2020, pp. 1-19.
Zhang Hang et al., "Design of light distribution of honeycomb Fresnel lens array", Optical Instruments, Feb. 28, 2016, pp. 53-58.
Satoshi Hasegawa et al., "Lens Accommodation to the Stereoscopic Vision on HMD", Virtual and Mixed Reality, Dec. 31, 2009, pp. 439-444.
"Notice of Allowance of China Related Application No. 201910163739.7", dated Jul. 29, 2021, pp. 1-4.

* cited by examiner

AUGMENTED REALITY DISPLAY SYSTEM AND DISPLAY METHOD THEREOF

CROSS-REFERENCE TO RELATED APPLICATION

This application claims the priority benefits of U.S. provisional application Ser. No. 62/640,578, filed on Mar. 9, 2018, and U.S. provisional application Ser. No. 62/642,613, filed on Mar. 14, 2018. The entirety of each of the above-mentioned patent applications is hereby incorporated by reference herein and made a part of this specification.

TECHNICAL FIELD

The technical field relates to an augmented reality display system and a display method thereof.

BACKGROUND

Thanks to advances in technology, people can obtain driving information, such as road warning information, intersection sign information or navigation information, through mobile devices or navigation devices while driving. However, if the mobile device or the navigation device is placed in the field of view, the driving safety will be affected. On the contrary, if the mobile device or the navigation device is placed outside the field of view, such as a seat, the driving risk is even greater when the driver lowers head to see the information.

In addition, a head-up display uses a projection method to project the vehicle speed, engine speed, road warning information, intersection sign information or navigation information onto the front windshield of the vehicle, thereby reducing the driving risk caused by the mobile device or the navigation device. However, if the image projected by the head-up display is too dark, it will be difficult for the user to recognize. On the contrary, if the image projected by the head-up display is too bright, it will be concerned that the field of view for driving might be blocked.

Furthermore, none of the above mobile devices, navigation devices or head-up displays integrate vehicle network information into the navigation system. Therefore, even if the user uses the mobile device, the navigation device, or the head-up display to obtain driving information, the user still cannot obtain the status of other vehicles on the driving route.

SUMMARY

An augmented reality display system according to an embodiment of the disclosure includes an input unit, an operation processing unit, and an output unit. The input unit is configured to obtain an environment information. The operation processing unit is configured to operate and process the environment information provided by the input unit to generate an output information, wherein the operation processing unit determines the display sequence, the display size, the display brightness, and the display color of the output information according to an importance weight. The output unit is configured to transmit the output information provided by the operation processing unit to a user. The output unit includes at least one display module. The at least one display module includes a transparent display, a first lens having a negative refractive power, a second lens having a negative refractive power, and a third lens having a positive refractive power in sequence from a display side to an eye side. The transparent display of the at least one display module is configured to emit a light beam, and the light beam is incident into the eyes of the user on the eye side through the first lens, the second lens and the third lens in sequence so that the eyes see an augmented reality image on the display side.

An augmented reality display method according to an embodiment of the disclosure includes: obtaining an environment information through an input unit; transmitting the environment information to an operation processing unit; operating and processing the environment information to generate an output information, wherein the operation processing unit determines the display sequence, the display size, the display brightness, and the display color of the output information according to an importance weight; transmitting the output information to an output unit; providing the output information to a user, wherein the output unit provides a light beam corresponding to the output information through a transparent display, and the output unit transmits the light beam to the user's eyes through a first lens having a negative refractive power, a second lens having a negative refractive power, and a third lens having a positive refractive power to generate an augmented reality image, wherein the transparent display, the first lens, the second lens, and the third lens are sequentially arranged from a display side to an eye side.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
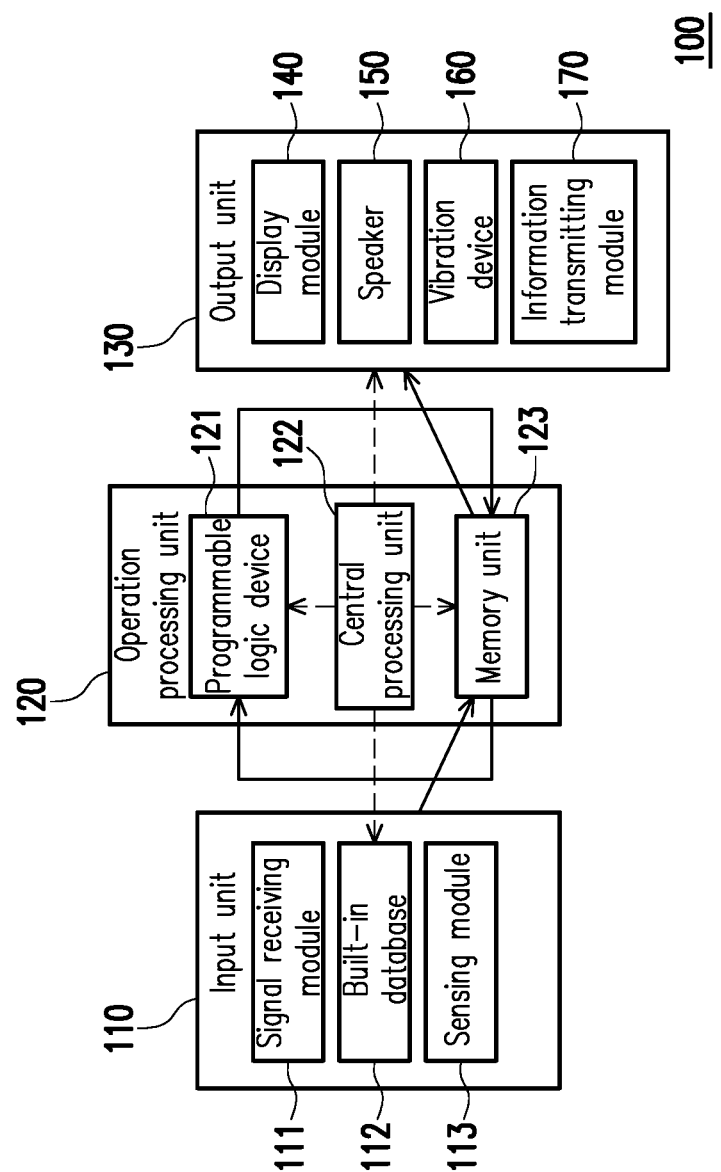
FIG. 1 is a schematic view of an augmented reality display system according to an embodiment of the disclosure.
Figure 2:
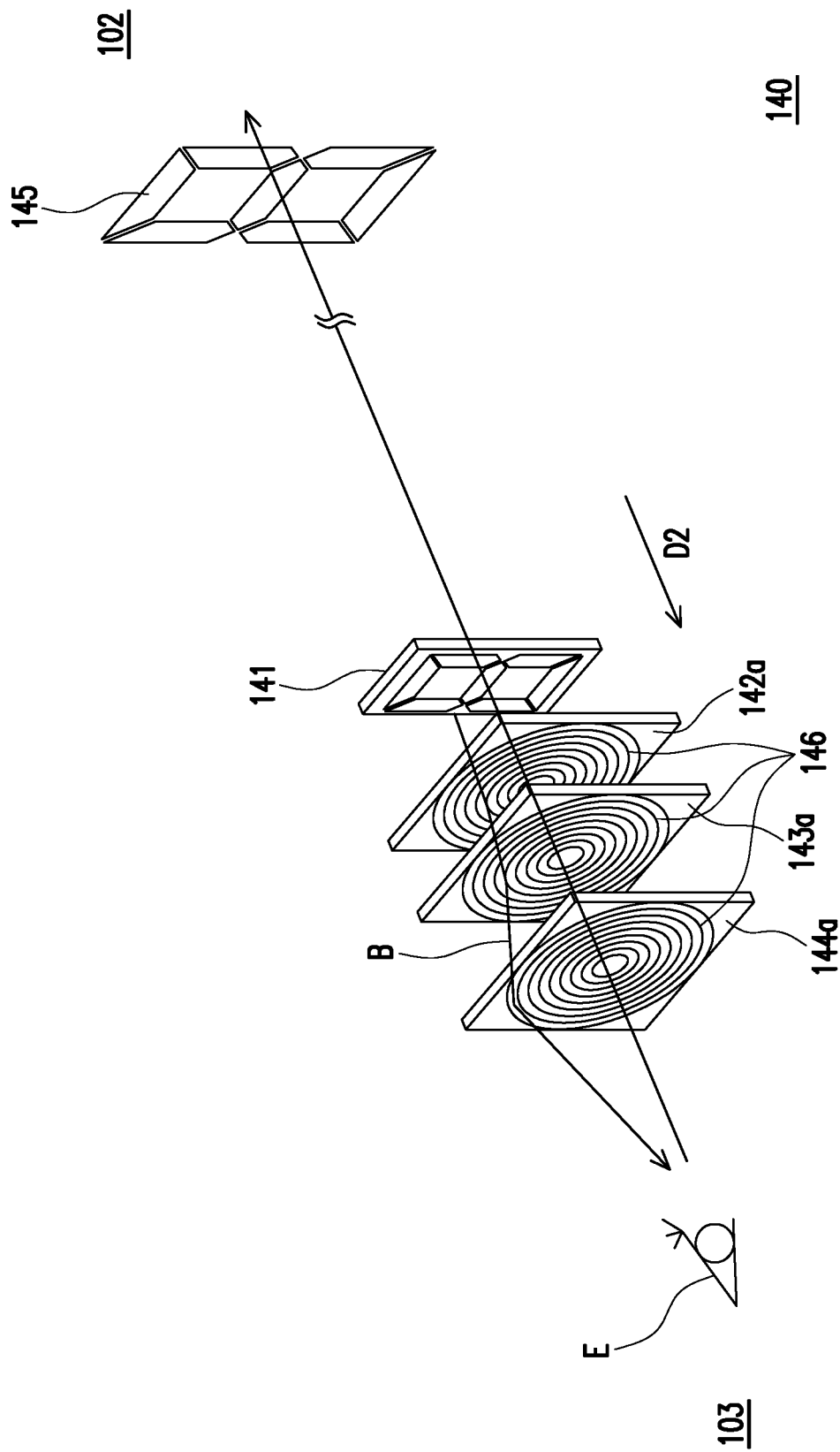
FIG. 2 is an example of an output unit of an augmented reality display system according to an embodiment of the disclosure.

FIG. 1 is a schematic view of an augmented reality display system according to an embodiment of the disclosure, wherein solid arrows represent data transmission lines and dashed arrows represent control lines. FIG. 2 is an example of an output unit of an augmented reality display system according to an embodiment of the disclosure.

Referring to FIG. 1 and FIG. 2, an augmented reality display system 100 of the present embodiment includes an input unit 110, an operation processing unit 120, and an output unit 130. The input unit 110 is configured to obtain an environment information. In this embodiment, the input unit 110 includes, for example, a signal receiving module 111, a built-in database 112, a sensing module 113, or a combination thereof.

In this embodiment, the information that the signal receiving module 111 can receive is, for example, Global Positioning System (GPS) map information, vehicle network information, a cloud database, or a combination thereof. The built-in database 112 is, for example, an electronic map. The sensing module 113 is, for example, a gyroscope, a depth sensor, a humidity sensor, a temperature sensor, a brightness sensor, an image capturing device, an electronic compass, a microphone, or a combination thereof.

Furthermore, the operation processing unit 120 is configured to operate and process the environment information provided by the input unit 110 to generate an output information, wherein the operation processing unit 120 determines the display sequence, the display size, the display brightness, and the display color of the output information according to an importance weight.

The operation processing unit 120 of FIG. 1 exemplifies the operation processing unit. However, the disclosure is not limited thereto. In an embodiment, the operation processing unit 120 includes, for example, a central processing unit (CPU) 122, a microprocessor, a digital signal processor (DSP), a programmable controller, a programmable logic device (PLD) 121 or other similar device or a combination of these devices, the disclosure provides no limitation thereto. Moreover, in an embodiment, the functions of the operation processing unit 120 may be implemented as a plurality of program codes. The program codes are stored in a memory unit 123 and executed by the operation processing unit 120. Alternatively, in an embodiment, the functions of operation processing unit 120 may be implemented as one or more circuits. The disclosure provides no limitation to implementation of the functions of the operation processing unit 120 in the form of software or hardware.

In addition, the output unit 130 is configured to transmit the output information provided by the operation processing unit 120 to a user (for example, the eye E of the user of FIG. 2). The output unit 130 includes at least one display module 140. The at least one display module 140 includes a transparent display 141, a first lens 142a having a negative refractive power, a second lens 143a having a negative refractive power, and a third lens 144a having a positive refractive power arranged in sequence from a display side 102 to an eye side 103. The transparent display 141 of the at least one display module 140 is configured to emit a light beam B, and the light beam B is incident to the eye E of the user on the eye side 103 through the first lens 142a, the second lens 143a, and the third lens 144a in sequence, such that the eye E sees an augmented reality image 145 located on the display side 102.

In this embodiment, the transparent display 141 refers to that the user can simultaneously see the background image behind the display and the display image of the display through the display. That is, the user can simultaneously see the background image on the display side 102 of the augmented reality display system 100 and the augmented reality image 145 through the transparent display 141. The transparent display 141 is, for example, an organic light emitting diode display, a liquid crystal display, or other suitable display, and the form of the transparent display 141 is not limited to the 7-segment display as shown in the drawing, and may also be a flat panel display having a rectangular pixel array and capable of displaying an image on the entire face.

In FIG. 2, a transparent display 141, a first lens 142a having a negative refractive power, a second lens 143a having a negative refractive power, and a third lens 144a having a positive refractive power are arranged in sequence along an arrangement direction D2, wherein the arrangement direction D2 is a direction from the display side 102 towards the eye side 103. In addition, the augmented reality image 145 is an enlarged virtual image.

In this embodiment, the output unit 130 further includes a speaker 150, a vibration device 160, an information transmitting module 170, or a combination thereof. For example, the output unit 130 provides the output information to the user through the speaker in the form of sound. For example, the output unit alerts the user in a vibrating manner through the vibration device 160. In addition, the output unit can transmit the environment information to the vehicle network through the information transmitting module 170, and convert the environment information obtained by the input unit 110 into output information and provide the information to other vehicles. In addition, the information transmitting module is, for example, a Bluetooth module unit, a WiFi (Wireless Fidelity) module unit, a wireless network module unit (for example, a 3G or 4G signal), or a combination thereof.

Figure 3A:
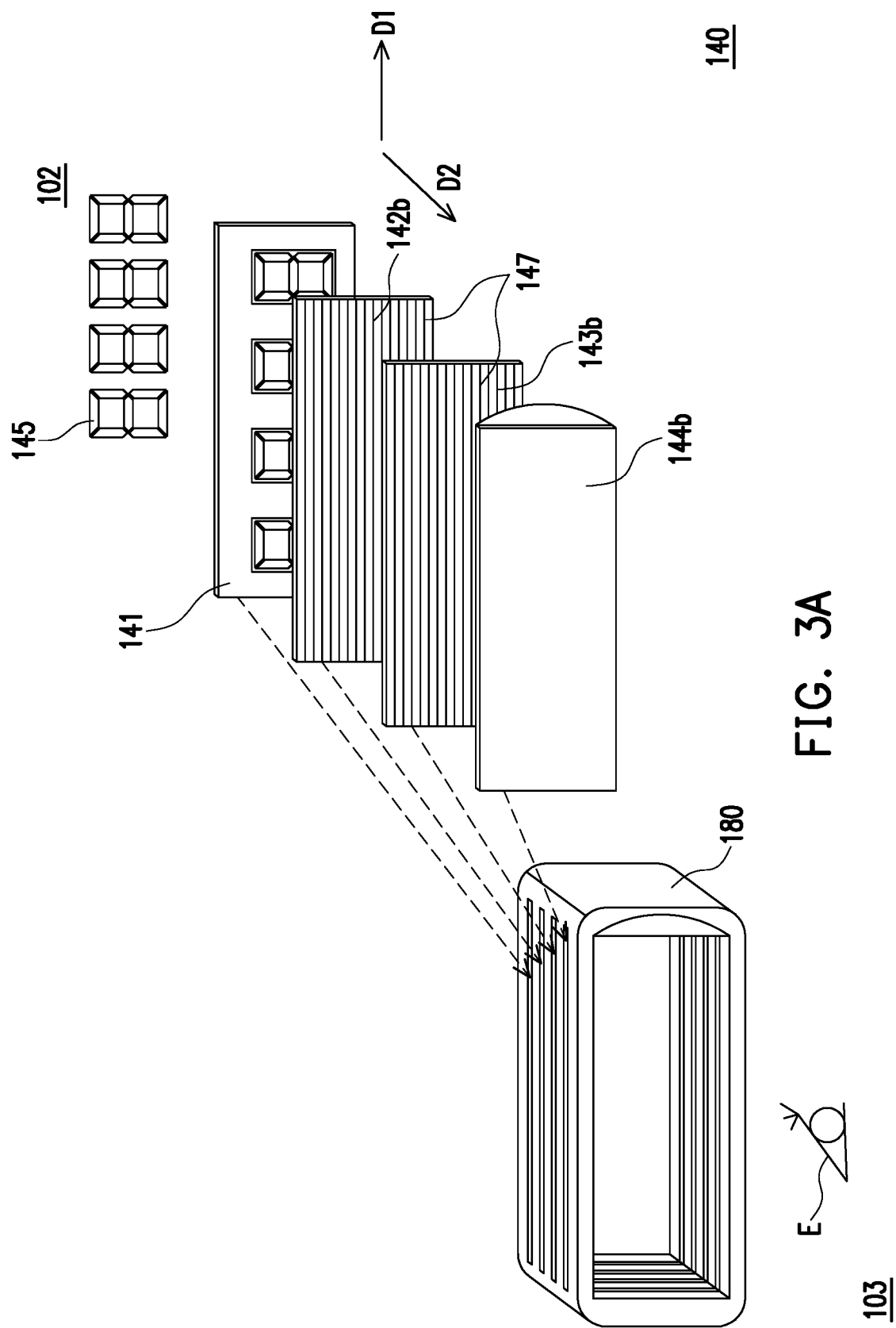
FIG. 3A is another example of an output unit of an augmented reality display system according to an embodiment of the disclosure.
Figure 3B:
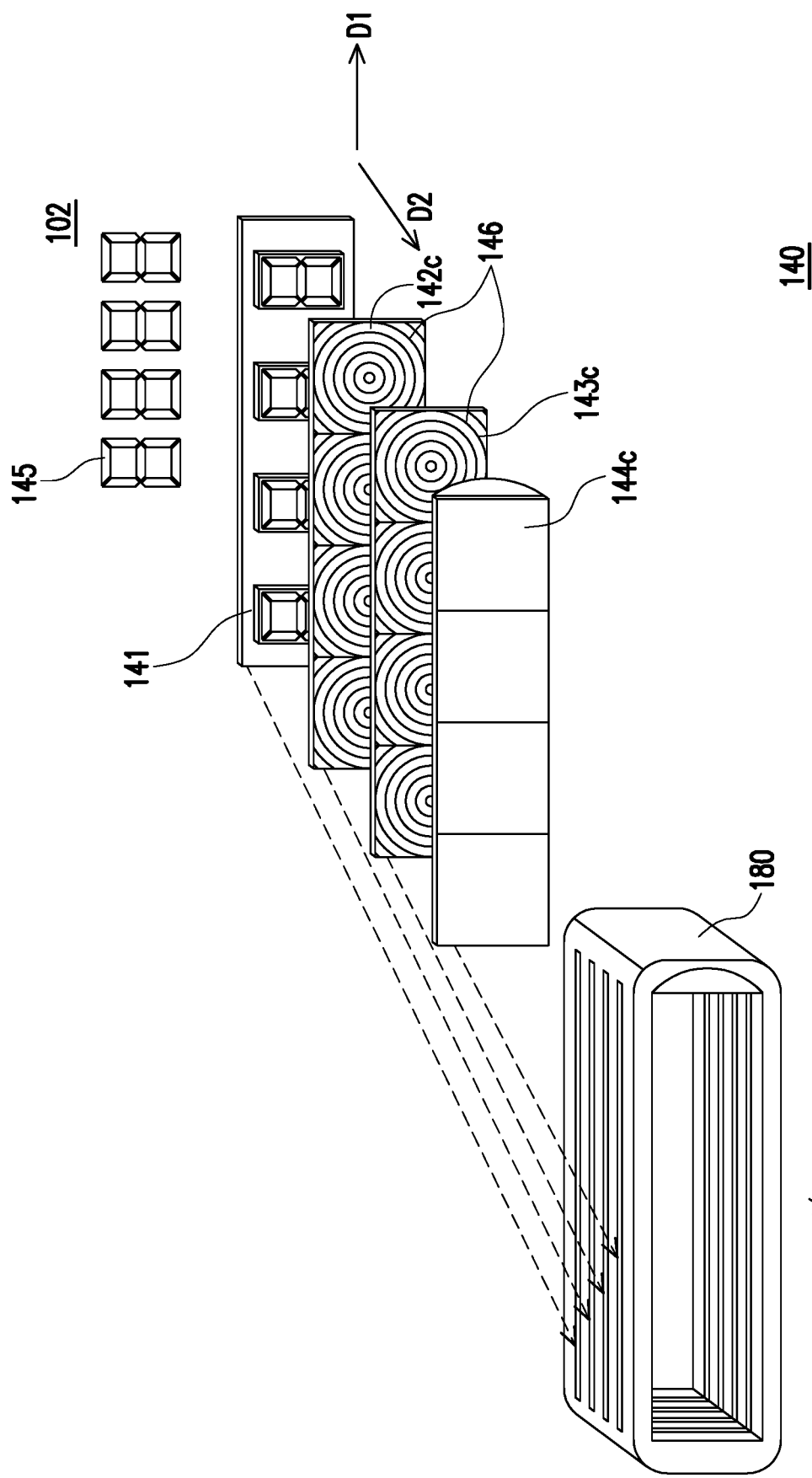
FIG. 3B is still another example of an output unit of an augmented reality display system according to an embodiment of the disclosure.

FIG. 3A is another example of an output unit of an augmented reality display system according to an embodiment of the disclosure. FIG. 3B is still another example of an output unit of an augmented reality display system according to an embodiment of the disclosure. Referring to FIG. 2, FIG. 3A and FIG. 3B, in the embodiment, the first lens 142a, 142b, 142c, the second lens 143a, 143b, 143c or the third lens 144a, 144b, 144c may be a lens having a continuous curved surface or a Fresnel lens, but the disclosure is not limited thereto. For example, the first lens 142a, the second lens 143a, and the third lens 144a in FIG. 2 are circular Fresnel lenses, and the Fresnel surface thereof has a plurality of concentric annular teeth 146. For example, the first lens 142b and the second lens 143b in FIG. 3A are cylindrical Fresnel lenses, and the Fresnel surface thereof has a plurality of strip teeth 147. Moreover, the third lens 144b in FIG. 3A is a cylindrical lens.

In FIG. 2, the first lens 142a, the second lens 143a, and the third lens 144a are respectively a single circular Fresnel lens disposed along the arrangement direction D2, but the disclosure is not limited thereto. In an embodiment, the number of the first lens 142a, the second lens 143a, and the third lens 144a may be set according to requirements of design. For example, they are arranged in a linear Fresnel lens array, a plane Fresnel lens array (i.e. two-dimensional Fresnel lens array), or a combination thereof.

For example, in FIG. 3A, each of the first lens 142b and the second lens 143b is a single cylindrical Fresnel lens, and the third lens 144b is a single cylindrical lens. That is, the at least one display module 140 is a display module 140. In an embodiment, each of the first lens 142b and the second lens 143b may be four cylindrical Fresnel lenses respectively spliced along an extending direction D1, and the third lens 144b may be four cylindrical lenses spliced along the extending direction D1. Moreover, the at least one transparent display 141 may be four transparent displays 141 spliced along the extending direction D1, or the transparent display 141 may have four display areas. That is, the at least one display module 140 may be four display modules 140. The transparent display 141 or the display area in each of the display modules 140 corresponds to one of the cylindrical Fresnel lenses in the first lens 142b and one of the cylindrical Fresnel lenses in the second lens 143b along the arrangement direction D2, and corresponds to one of the cylindrical lenses in the third lens 144b along the arrangement direction D2.

For example, in FIG. 3B, the first lens 142c and the second lens 143c are four circular Fresnel lenses spliced along the extending direction D1, and the third lens 144c is a lens having a continuous curved surface. That is, the at least one display module 140 is a display module 140. In an embodiment, the third lens 144c may be four lenses, each having a continuous curved surface, spliced along the extending direction D1. Moreover, the transparent display 141 may be four transparent displays 141 spliced along the extending direction D1, or the transparent display 141 has four display areas. That is, the at least one display modules 140 may be four display modules 140. The transparent display 141 or the display area in each of the display modules 140 corresponds to one of the circular Fresnel lenses in the first lens 142c and one of the circular Fresnel lenses in the second lens 143c along the arrangement direction D2, and corresponds to one of the lenses in the third lens 144c along the arrangement direction D2.

It should be noted that, in the embodiment of the disclosure, in order to facilitate the use of the display module 140 of the output unit 130, the display module 140 may be disposed in a frame 180. For example, the transparent display 141, the first lens 142b, the second lens 143b, and the third lens 144b in FIG. 3A as well as the transparent display 141, the first lens 142c, the second lens 143c, and the third lens 144c in FIG. 3B may all be disposed in the frame 180 respectively, but the disclosure is not limited thereto. In an embodiment, the lenses or the lens and the display may be cemented to each other to form at least one cemented optical component and then disposed in the frame 180. For example, the transparent display 141 may be cemented to the first lens 142c to form an optical component, and the second lens 143c and the third lens 144c may be cemented into another optical component. Then the two cemented optical components are disposed within the frame 180, respectively.

Furthermore, the transparent display 141 in the above embodiment is disposed between the augmented reality image 145 and the first lenses 142a, 142b, and 142c, but the disclosure is not limited thereto. In an embodiment, the transparent display 141 may be disposed between the augmented reality image 145 and the user's eye E. For example, the transparent display 141 may be disposed between the first lenses 142a, 142b, 142c and the second lenses 143a, 143b, 143c.

Figure 4A:
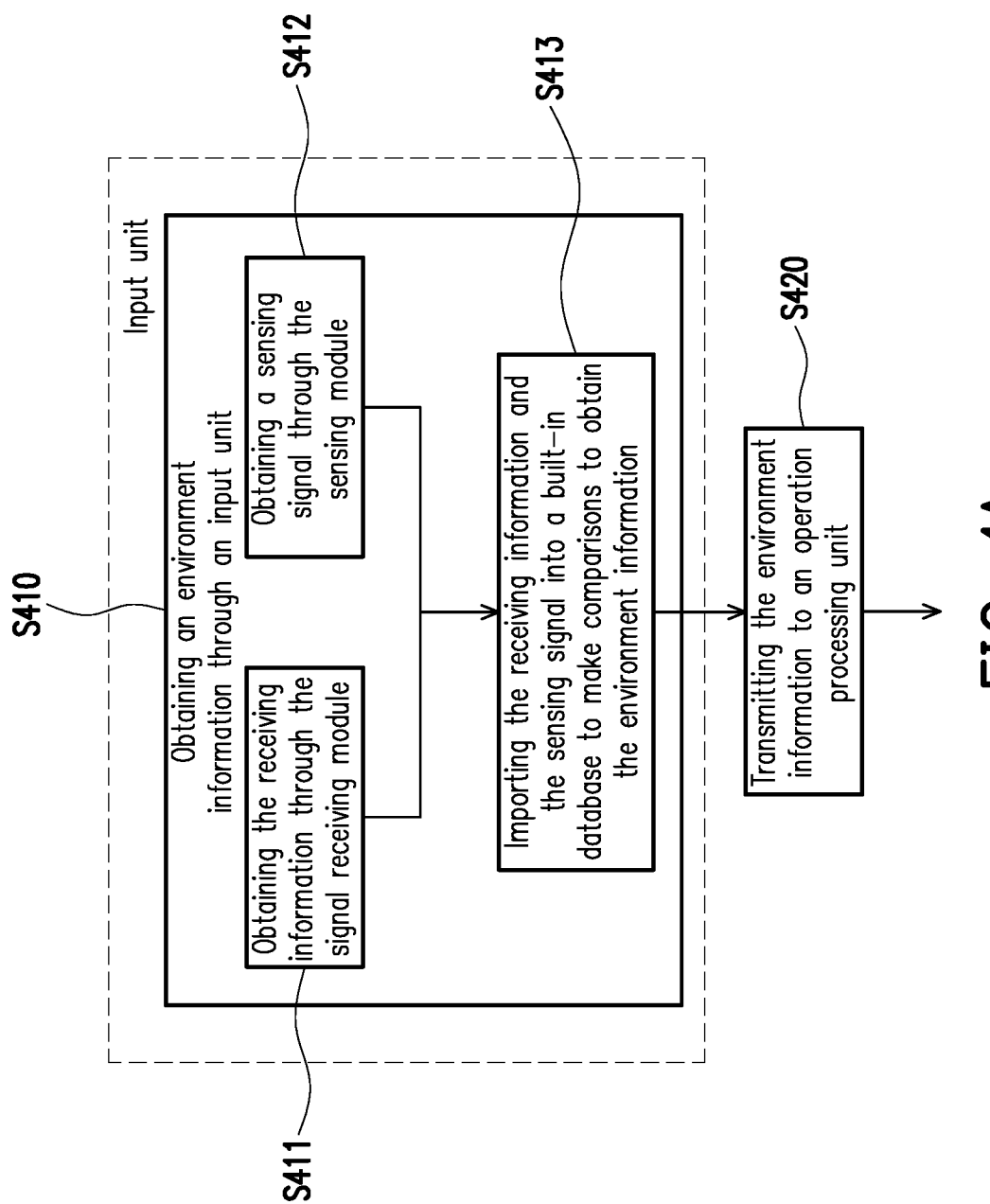
FIG. 4A is a partial flow chart of an augmented reality display method according to an embodiment of the disclosure.
Figure 4B:
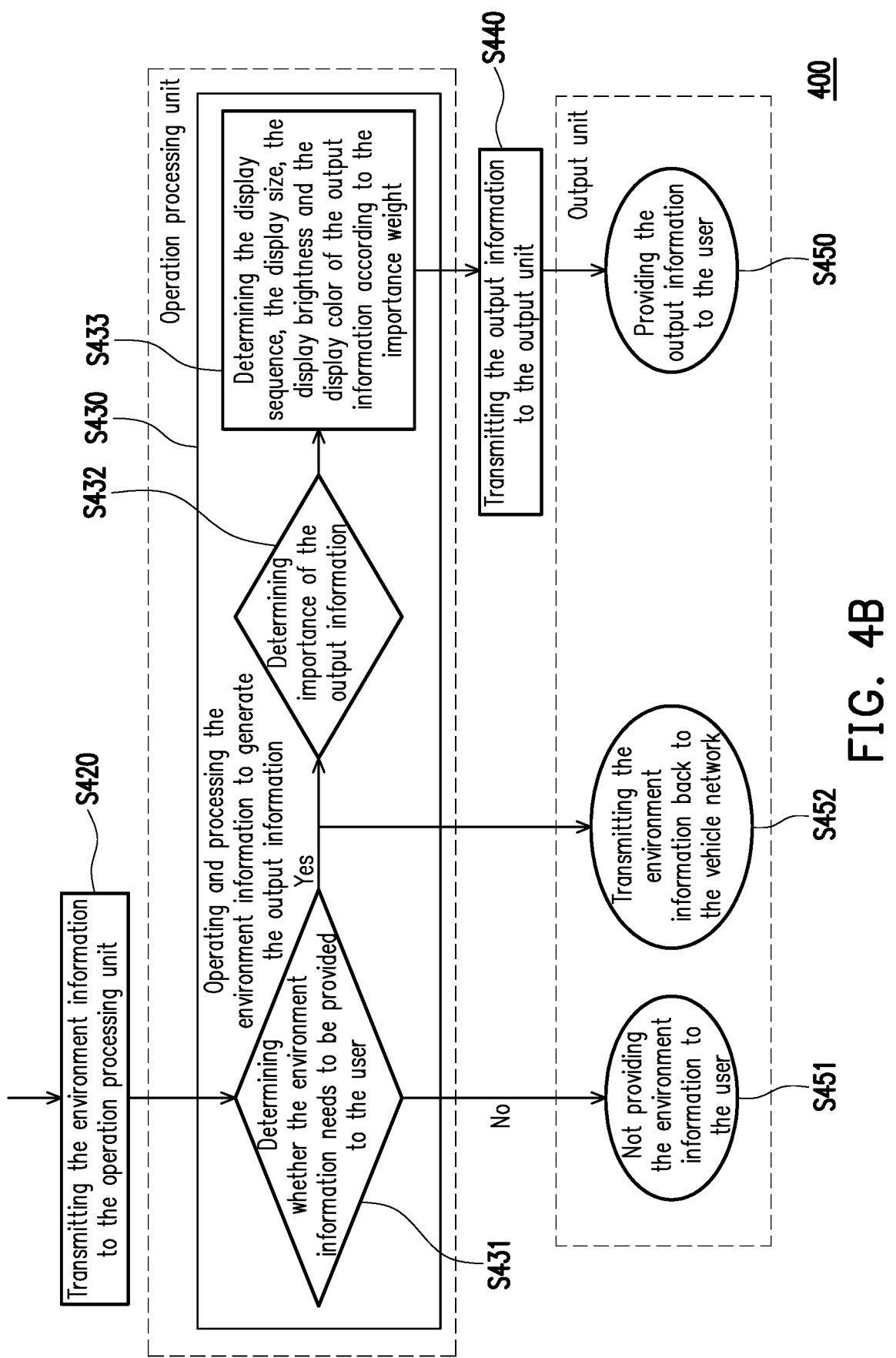
FIG. 4B is another partial flow chart of an augmented reality display method according to an embodiment of the disclosure.

FIG. 4A is a partial flow chart of an augmented reality display method according to an embodiment of the disclosure. FIG. 4B is another partial flow chart of an augmented reality display method according to an embodiment of the disclosure. Referring to FIG. 4A and FIG. 4B, the augmented reality display method 400 using the augmented reality display system 100 of the embodiment of the disclosure includes steps S410, S420, S430, S440, and S450.

In step S410, the augmented reality display system 100 obtains an environment information through an input unit 110, which includes step S411, step S412, and step S413. In detail, the input unit 110 obtains a receiving information through the signal receiving module 111 and obtains a sensing signal through the sensing module 113 respectively. Then, the input unit 110 imports the receiving information and the sensing signal into a built-in database 112 to make comparisons to obtain the environment information.

In step S420, the input unit 110 transmits the environment information to an operation processing unit 120.

Next, in step S430, the operation processing unit 120 operates and processes the environment information to generate an output information, which includes steps S431, S432, and S433. Specifically, the operation processing unit 120 first determines whether the environment information needs to be provided to the user. If yes, the environment information is transmitted back to the vehicle network through the output unit 130 (i.e., step S452), and the importance of the output information is determined (step S432), wherein the operation processing unit 120 determines the display sequence, the display size, the display brightness and the display color of the output information according to an importance weight (step S433). If not, the environment information is not provided to the user (i.e., step S451).

Furthermore, in step S440, the operation processing unit 120 transmits the output information to the output unit 130 in accordance with the above-described steps S432 and S433. In step S450, the output unit 130 then provides output information to the user.

It should be noted that the information is transmitted between the input unit 110, the operation processing unit 120 and the output unit 130 in a wireless manner, or the information is transmitted between the input unit 110, the operation processing unit 120 and the output unit 130 in a wired manner. However, the disclosure is not limited thereto. The information may transmitted between the input unit 110, the operation processing unit 120 and the output unit 130 in a wireless or wired manner simultaneously. For example, the operation processing unit 120 is a mobile device, the speaker 150 of the output unit 130 is a Bluetooth headset, and the output unit 130 has a vibration device 160. Therefore, the operation processing unit 120 and the output unit 130 transmit information to each other in a wireless manner, and provide the output information to the user through the Bluetooth headset. Moreover, the operation processing unit 120 and the output unit 130 may simultaneously transmit information to each other in a wired manner, and alert the user to the output information through the vibration device 160.

Figure 5:
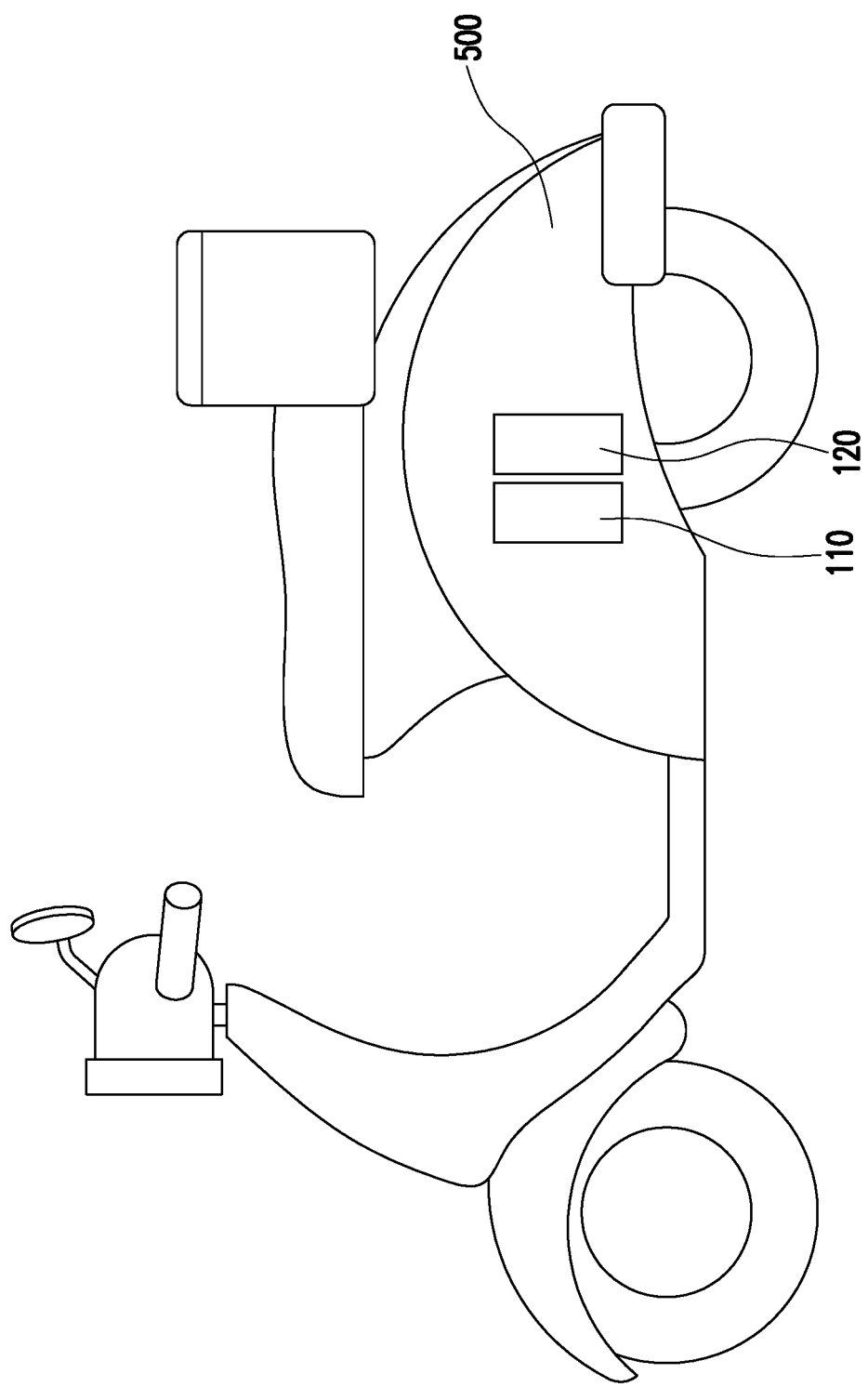
FIG. 5 is an example of an input unit and an operation processing unit disposed on a transportation vehicle according to an embodiment of the disclosure.
Figure 6:
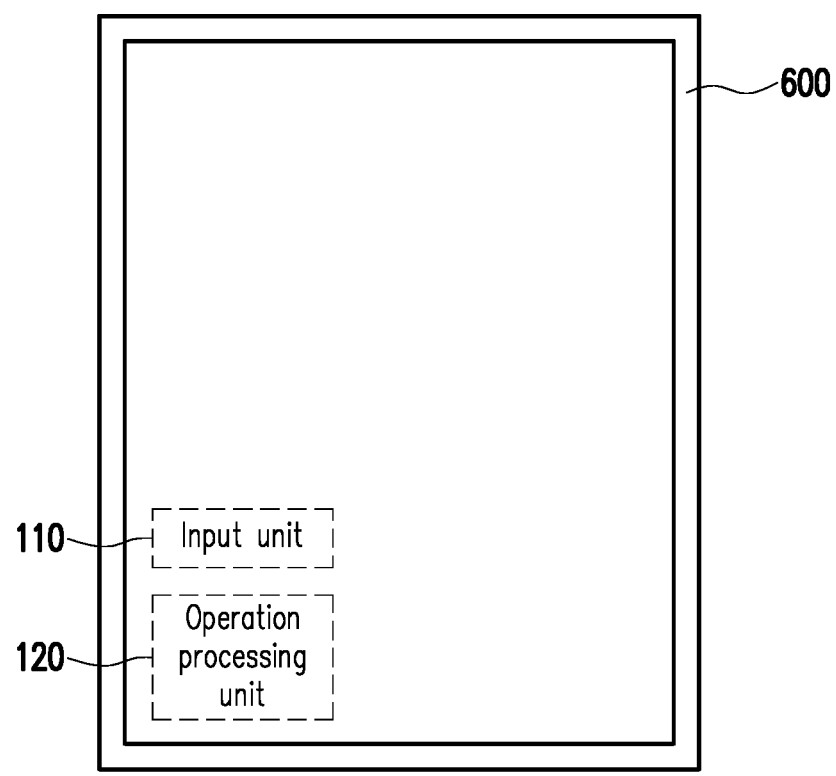
FIG. 6 is an example illustrating an input unit and an operation processing unit disposed on a mobile device according to an embodiment of the disclosure.

For example, FIG. 5 is an example of an input unit and an operation processing unit disposed on a transportation vehicle according to an embodiment of the disclosure. FIG. 6 is an example illustrating an input unit and an operation processing unit disposed on a mobile device according to an embodiment of the disclosure. Referring to FIG. 5 and FIG. 6, the input unit 110 and the operation processing unit 120 of the embodiment of the disclosure may be disposed on a transportation vehicle 500 or disposed on a mobile device 600, such as a mobile phone, a tablet personal computer (PC), a personal digital assistant (PDA) or a car PC. Therefore, the input unit 110 and the operation processing unit 120 may transmit information to each other in a wireless or a wired manner according to actual needs.

Figure 7A:
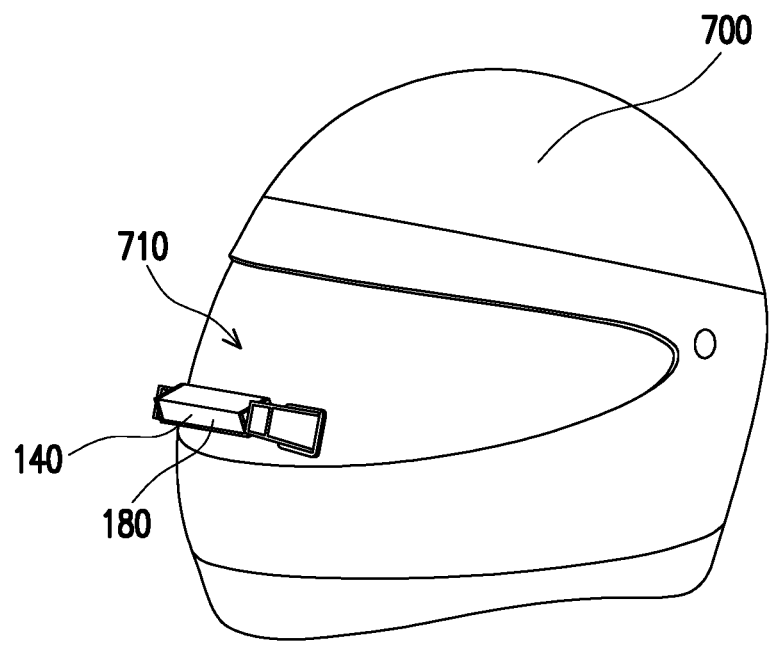
FIG. 7A is an example illustrating an output unit disposed on a motorcycle helmet according to an embodiment of the disclosure.
Figure 7B:
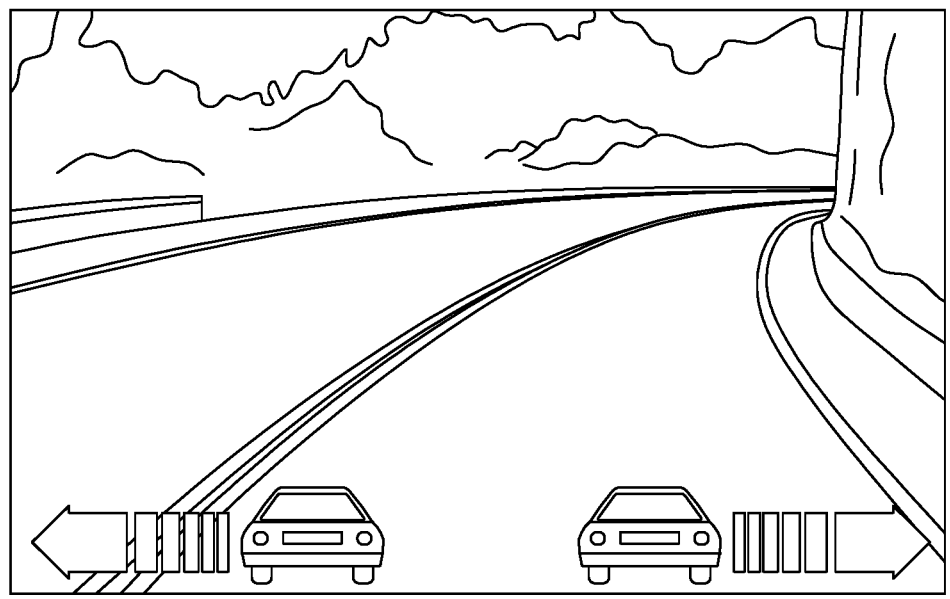
FIG. 7B to FIG. 7F are examples respectively illustrating an augmented reality image in which an output unit generates vehicle approach warning information, road warning information, vehicle speed, engine speed, and navigation information according to an embodiment of the disclosure.
Figure 7C:
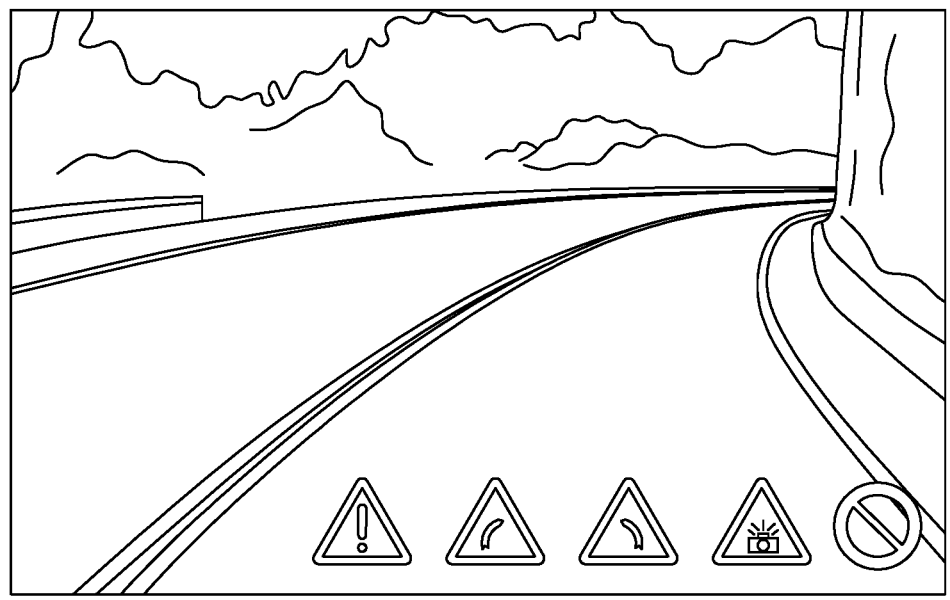
Figure 7D:
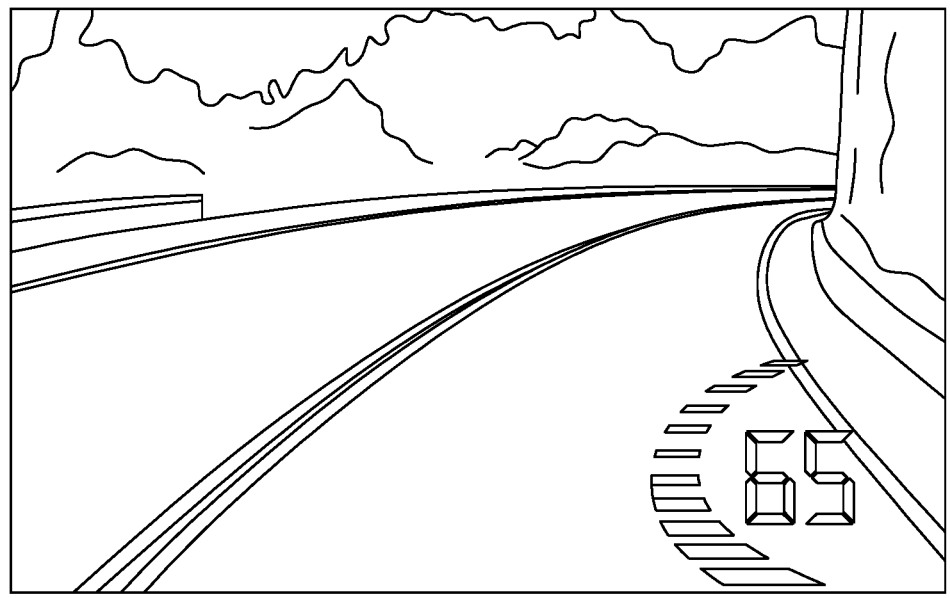
Figure 7E:
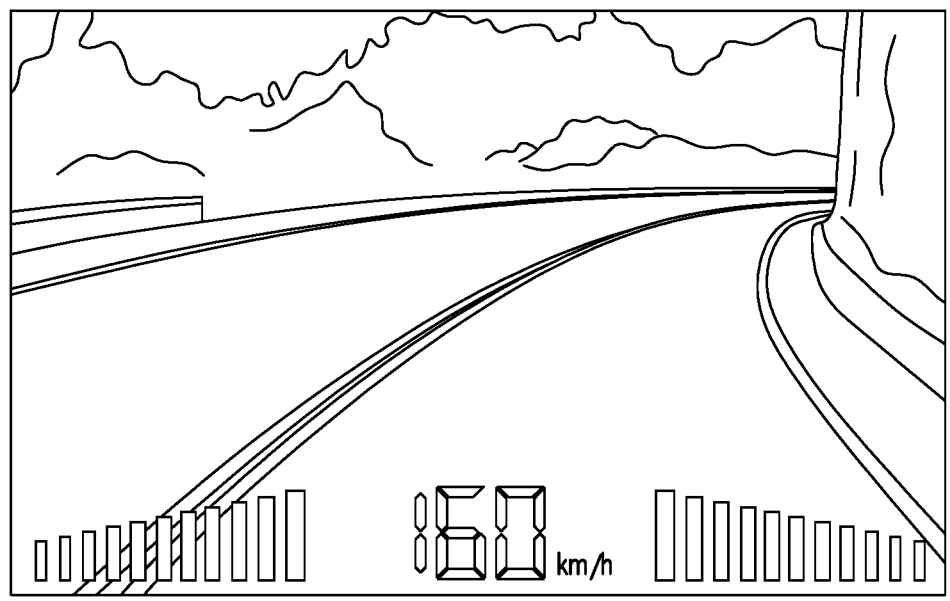
Figure 7F:
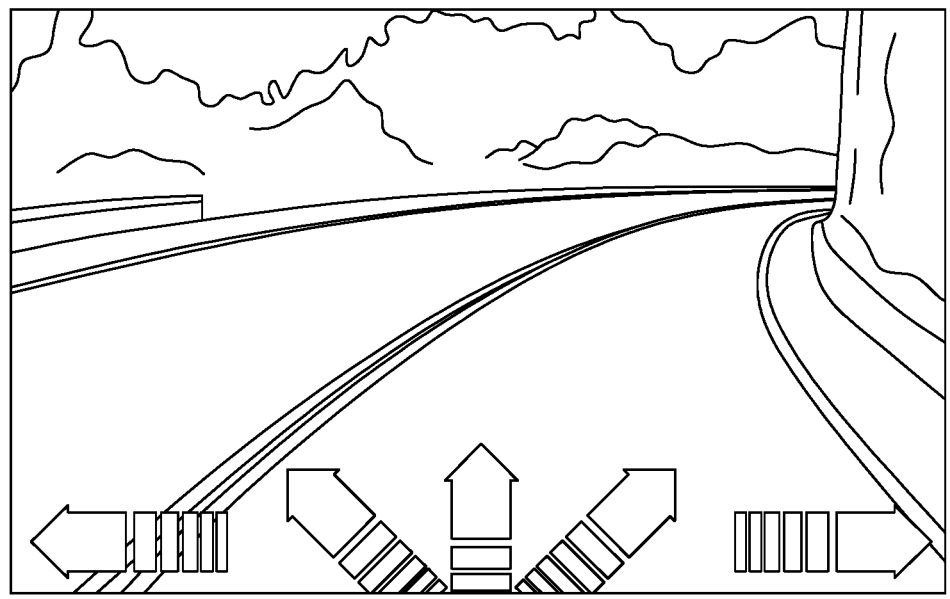

Furthermore, FIG. 7A is an example illustrating an output unit disposed on a motorcycle helmet according to an embodiment of the disclosure. FIG. 7B to FIG. 7F are examples respectively illustrating an augmented reality image in which an output unit generates vehicle approach warning information, road warning information, vehicle speed, engine speed, and navigation information according to an embodiment of the disclosure. Referring to FIG. 7A to FIG. 7F, the display module 140 of the output unit 130 of the embodiment of the disclosure may be disposed on a mask surface 710 of a motorcycle helmet 700 through the frame 180. Therefore, the input unit 110 and the operation processing unit 120 disposed on the transportation vehicle 500 or the mobile device 600 can transmit the output information to the output unit 130 disposed on the motorcycle helmet 700 in a wireless manner.

In addition, the output information includes vehicle approach warning information (such as FIG. 7B), road warning information (such as FIG. 7C), engine speed (such as FIG. 7D), intersection sign information (such as traffic lights at the front intersection), vehicle speed (for example, FIG. 7E), navigation information (such as FIG. 7F), inter-vehicle communication warnings of road and car conditions in vehicle network, weather information, time information, calls and mails display, information regarding Internet of Things, smart city sharing information (such as notification of electric poles or traffic lights at important intersections) or a combination thereof.

Figure 8:
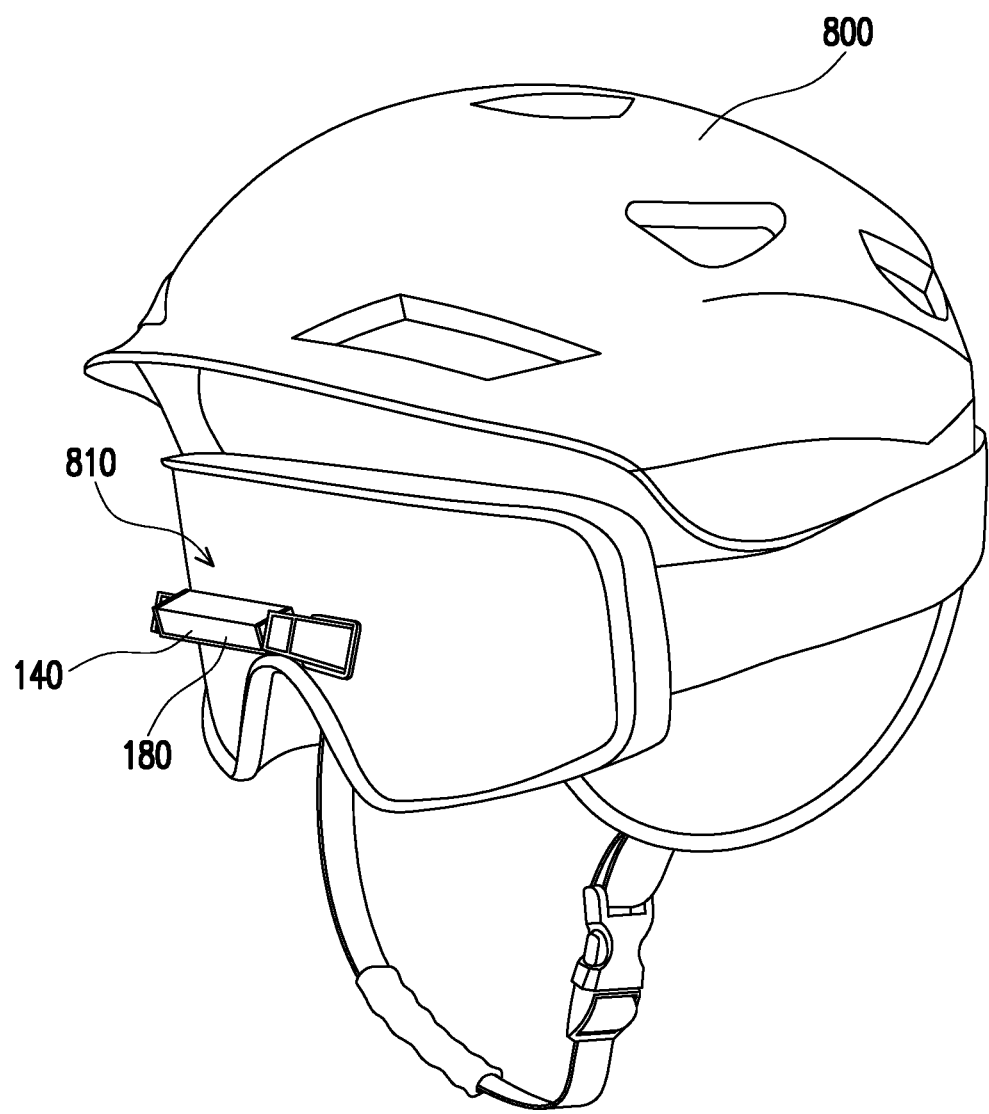
FIG. 8 is an example illustrating an output unit disposed on a sport helmet according to an embodiment of the disclosure.

FIG. 8 is an example illustrating an output unit disposed on a sport helmet according to an embodiment of the disclosure. Referring to FIG. 8, the display module 140 of the output unit 130 of the embodiment of the disclosure may be disposed on the mask surface 810 of a sport helmet 800 through the frame 180, and the output information includes the user's physiological data, global positioning system (GPS) map information, sports information, weather information, time information, calls and mails display, information regarding Internet of Things or a combination thereof.

It should be mentioned that the display module 140 of the output unit 130 is disposed on the sport helmet 800, and the input unit 110 and the operation processing unit 120 may be disposed on the mobile device 600, a smart watch, a smart suit, or a combination thereof.

In addition, the display module 140 of the output unit 130 is disposed on the motorcycle helmet 700 or the sport helmet 800, and the at least one display module 140 may have flexibility. Therefore, the display module 140 of the output unit 130 can be curvedly disposed on the mask of the motorcycle helmet 700 or the mask of the sport helmet 800 in accordance with the curvature of the masks.

Figure 9A:
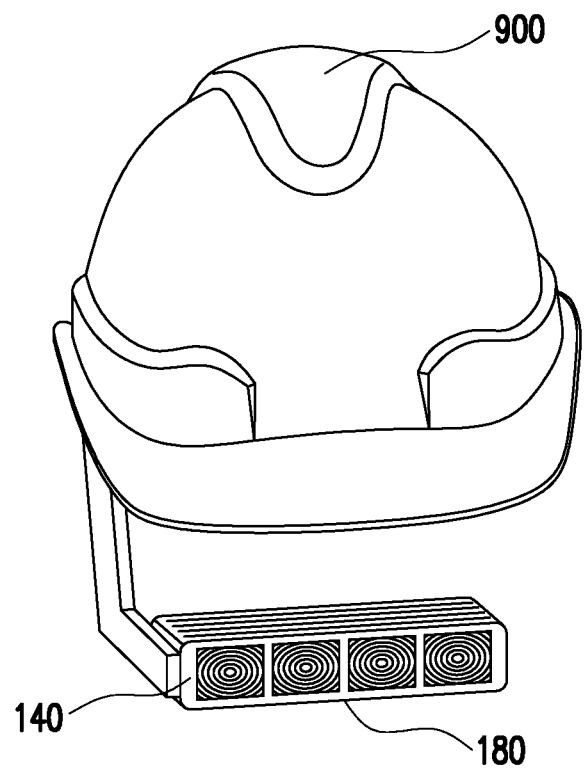
FIG. 9A is an example illustrating an output unit disposed on an industrial safety helmet according to an embodiment of the disclosure.
Figure 9B:
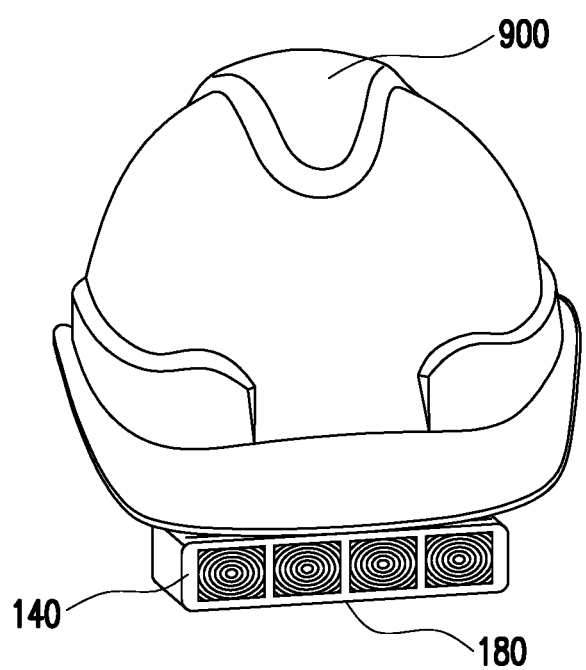
FIG. 9B is another example illustrating an output unit disposed on an industrial safety helmet according to an embodiment of the disclosure.

FIG. 9A is an example illustrating an output unit disposed on an industrial safety helmet according to an embodiment of the disclosure. FIG. 9B is another example illustrating an output unit disposed on an industrial safety helmet according to an embodiment of the disclosure. Referring to FIG. 9A and FIG. 9B, the display module 140 of the output unit 130 of the embodiment of the disclosure may be disposed on an industrial helmet 900 through the frame 180, and the input unit 110 and the operation processing unit 120 may be disposed on the mobile device 600, a smart watch, a smart suit, a central server of a factory or a combination thereof. Therefore, the output information may include a work station monitoring data, a working environment monitoring information (such as temperature, humidity, air pressure, chemical component in air, intensity of electromagnetic wave or radiation dose, etc.), a time information, a calls and mails display, an industrial internet information or a combination thereof.

Figure 10:
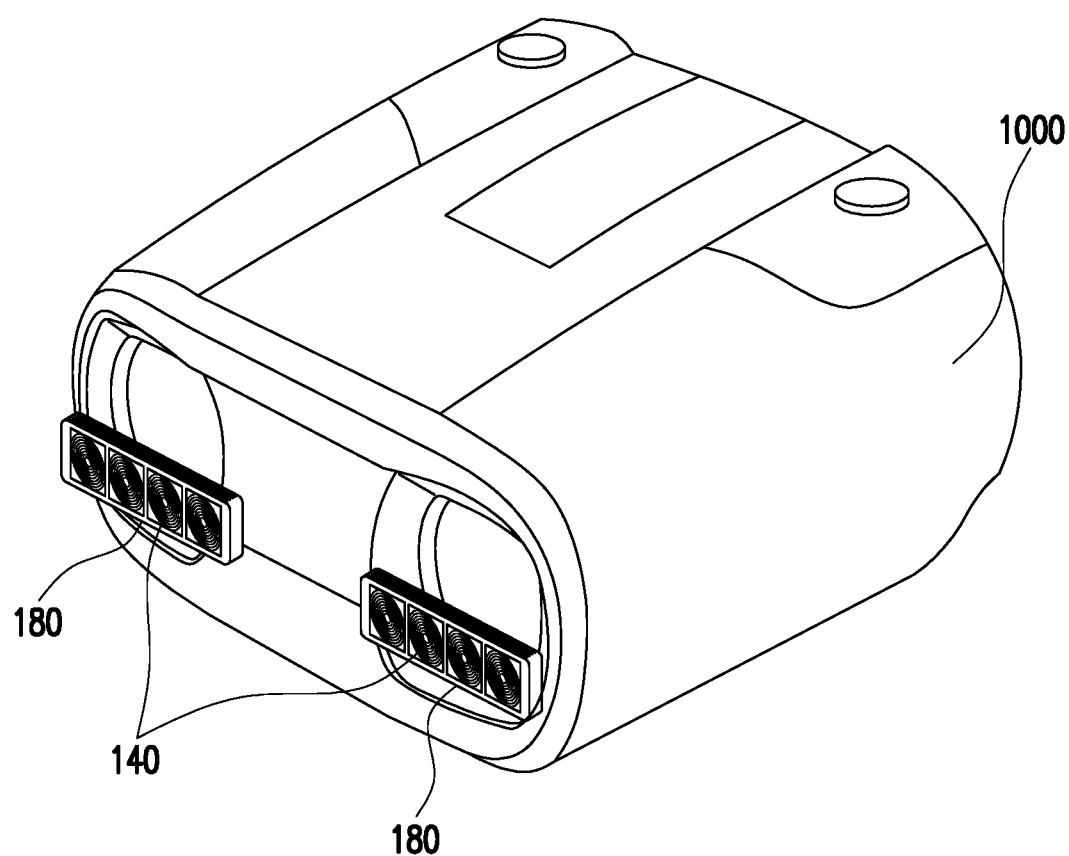
FIG. 10 is an example illustrating an output unit disposed on a telescope according to an embodiment of the disclosure.

FIG. 10 is an example illustrating an output unit disposed on a telescope according to an embodiment of the disclosure. Referring to FIG. 10, the display module 140 of the output unit 130 of the embodiment of the disclosure may be disposed on a telescope 1000 through the frame 180, and the output information includes a GPS map information, a time information, or a combination thereof. In addition, the telescope 1000 in FIG. 10 is a mobile telescope, but the disclosure is not limited thereto, and the display module 140 of the output unit 130 may be disposed, for example, on a fixed telescope at an observation deck.

Furthermore, the augmented reality display system 100 and the augmented reality display method 400 of the embodiments of the disclosure may further be applied to augmented reality glasses, augmented reality head-mounted displays, e-sports displays, head-up displays, or other suitable augmented reality devices, the disclosure provides no limitation thereto.

Based on the above, the augmented reality display system 100 and the transparent display 141 of the augmented reality display method 400 of the embodiment of the disclosure can provide a light beam B corresponding to the output information, and transmit the light beam B to the user's eye E through the first lens 142a, the second lens 143a, and the third lens 144a to generate an augmented reality image 145. Therefore, the augmented reality display system 100 and the augmented reality display method 400 of the embodiments of the disclosure can reduce blocking of user's field of view and provide the environment information to the user. In addition, not only that the environment information obtained by the input unit 110 includes vehicle network information, but also the output unit 130 can further transmit the environment information back to the vehicle network. In this manner, the latest vehicle network information is instantly available to users. Moreover, the at least one display module 140 of the output unit 130 has flexibility and thus being adapted to be disposed on a surface of the carrier to fit the curvature of the carrier. Therefore, the augmented reality display system 100 and the augmented reality display method 400 of the embodiments of the disclosure can reduce uncomfortable sensation of the user when in use.

Based on the above description of the augmented reality display system 100 and the augmented reality display method 400 of the embodiment of the disclosure, another five scenarios are provided below to exemplify how to apply the augmented reality display system 100 and the augmented reality display method 400 of the embodiment of the disclosure. However, the disclosure is not limited to the five scenarios. The augmented reality display system 100 and the augmented reality display method 400 may be designed according to actual needs, for example, how the operation processing unit 120 processes determination of information importance may be adjusted to adapt to the change of configuration of traffic signs on the roads or traffic rules.

Figure 11:
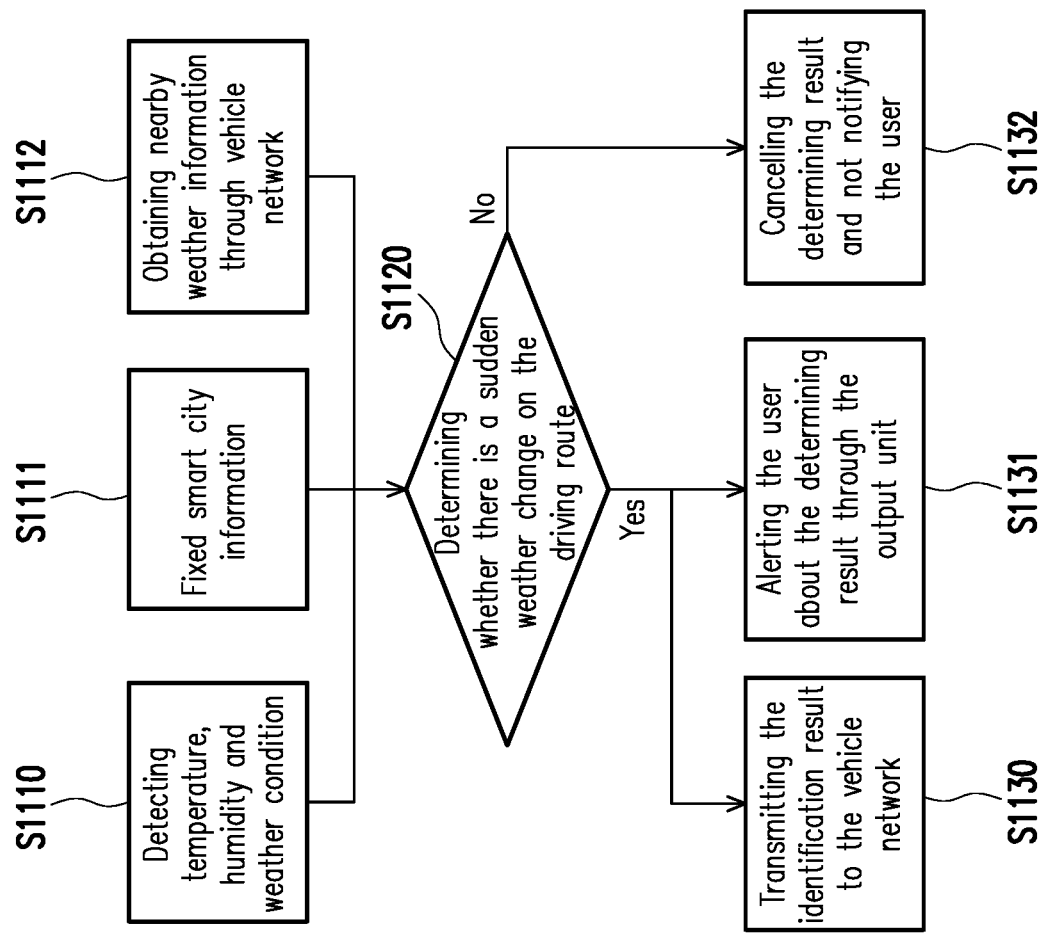
FIG. 11 is an exemplary flow chart illustrating applying an augmented reality display system in an embodiment of the disclosure to a first scenario.

FIG. 11 is an exemplary flow chart illustrating applying an augmented reality display system in an embodiment of the disclosure to a first scenario. Referring to FIG. 11, for example, it is a scenario where how the augmented reality display system 100 determines whether there is a sudden weather change on the driving route. The input unit 110 can detect the temperature and humidity as well as weather conditions according to the sensing module 113 (step S1110), or according to the fixed smart city information obtained by the signal receiving module 111 or the built-in database 112 (step S1111), or the signal receiving module 111 obtains the environment information through the nearby weather information obtained by the vehicle network (step S1112). The operation processing unit 120 determines whether there is sudden weather change on the driving route, and then determines whether the environment information needs to be provided to the user (step S1120). If yes, the user is alerted about the determining result through the output unit 130 (step S1131), and the identification result is transmitted back to the vehicle network (step S1130). If not, the determining result is canceled and the user is not notified (step S1132).

Figure 12:
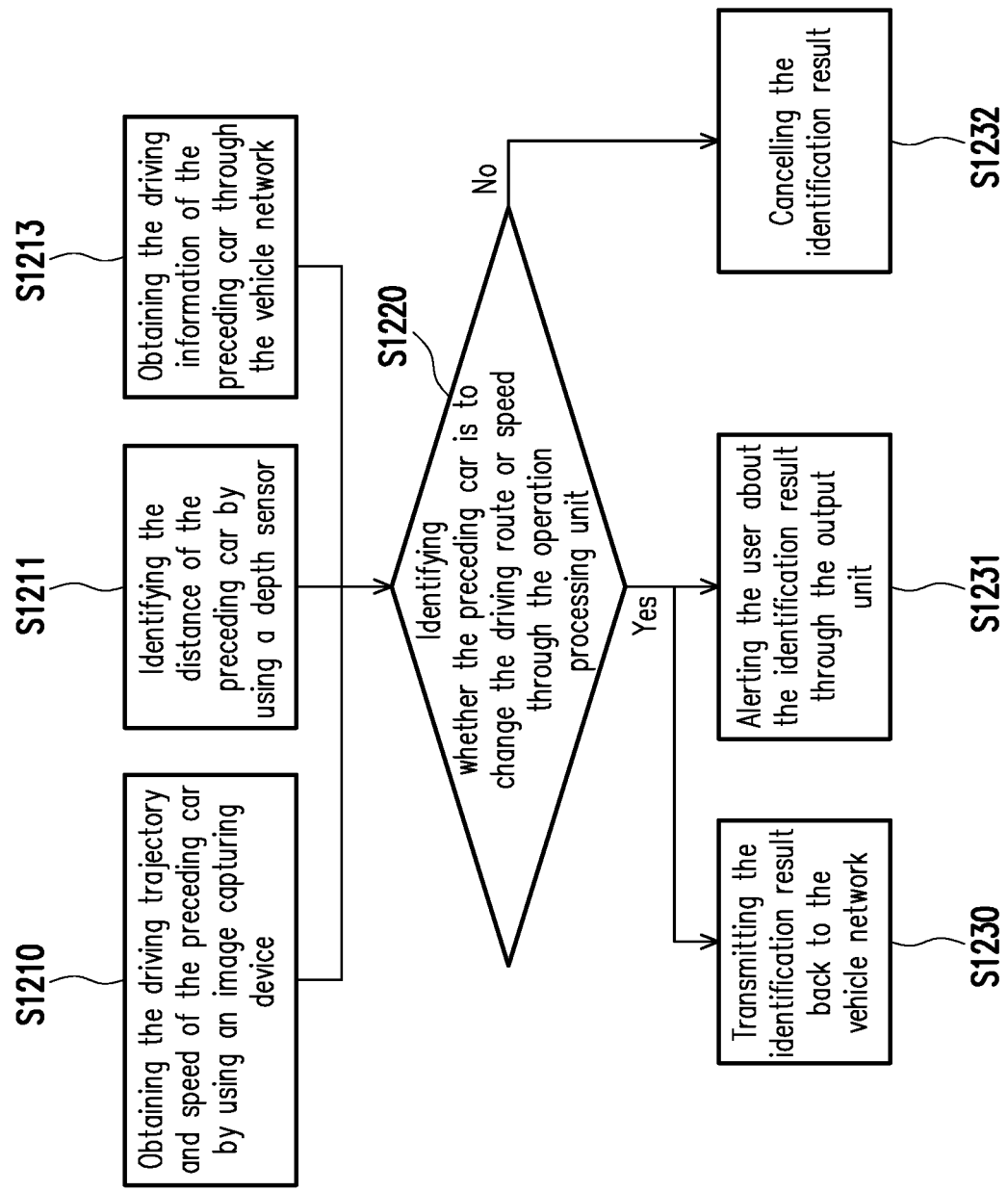
FIG. 12 is an exemplary flow chart illustrating applying an augmented reality display system in an embodiment of the disclosure to a second scenario.

FIG. 12 is an exemplary flow chart illustrating applying an augmented reality display system in an embodiment of the disclosure to a second scenario. Referring to FIG. 12, for example, it is a scenario where the augmented reality display system 100 can identify whether the preceding vehicle is to change the driving route or speed. Specifically, the input unit 110 can obtain the driving trajectory and the speed of the preceding vehicle by using the image capturing device (step S1210), identify the distance of the preceding vehicle by using a depth sensor (step S1211) and obtain the driving information of the preceding vehicle through the vehicle network (step S1213). Next, the operation processing unit 120 is used to identify whether the preceding vehicle is to change the driving route or speed, and then determine whether the environment information needs to be provided to the user (step S1220). If yes, the user is alerted about the identification result through the output unit 130 (step S1231), and the identification result is transmitted back to the vehicle network (step S1230). If not, the identification result is canceled and the user is not notified (step S1232).

Figure 13:
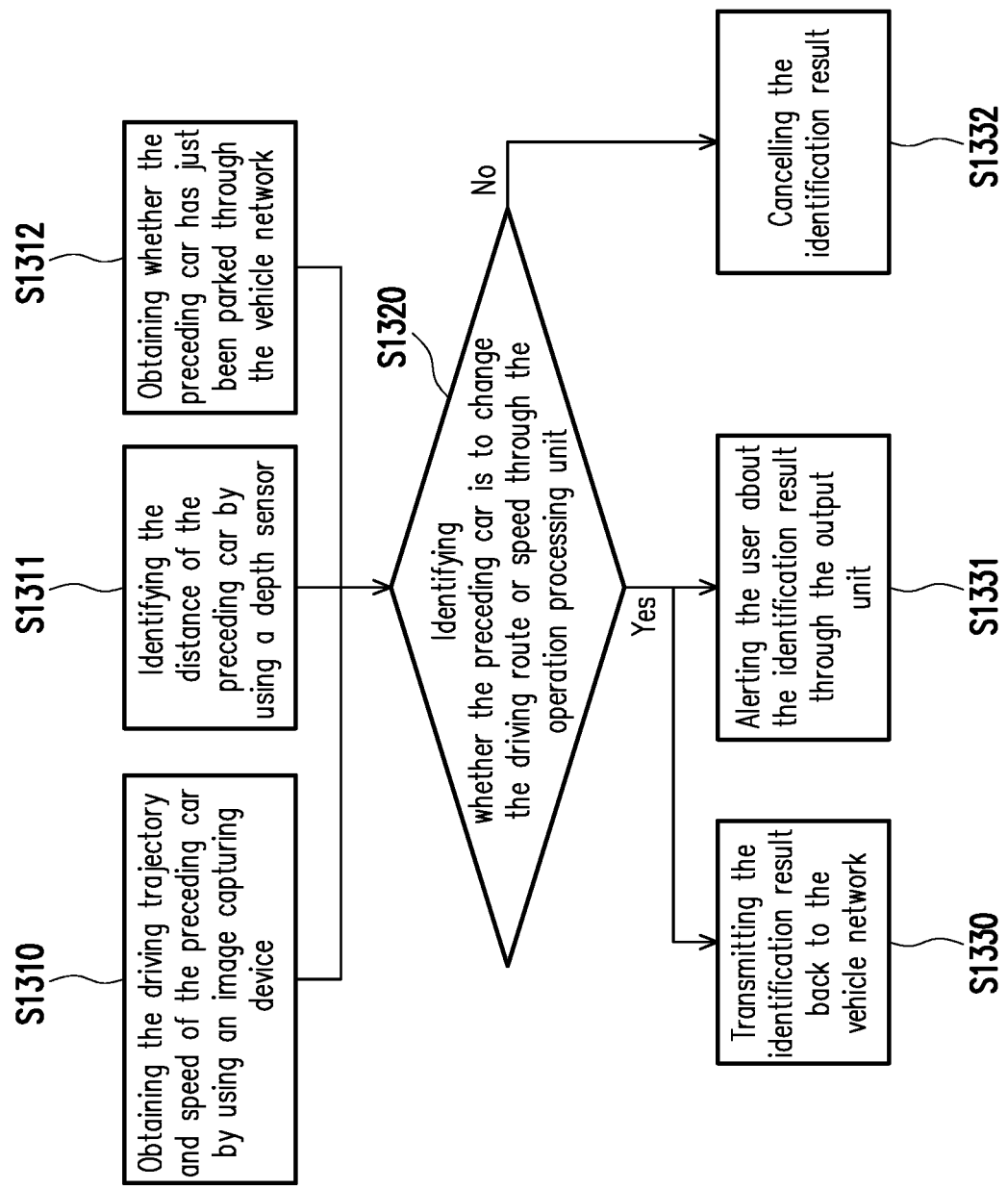
FIG. 13 is an exemplary flow chart illustrating applying an augmented reality display system in an embodiment of the disclosure to a third scenario.

FIG. 13 is an exemplary flow chart illustrating applying an augmented reality display system in an embodiment of the disclosure to a third scenario. Referring to FIG. 13, it is a scenario where the augmented reality display system 100 can pre-determine, for example, that a vehicle parked along the roadside might open a vehicle door and the driving speed or the driving route needs to be adjusted. Specifically, the input unit 110 can obtain the driving trajectory and the speed of the preceding vehicle by using the image capturing device (step S1310), identify the distance of the preceding vehicle by using the depth sensor (step S1311) and obtain that whether the preceding vehicle has just been parked through the vehicle network (step S1312). Next, the operation processing unit 120 is used to identify whether the preceding vehicle is to change the driving route or speed, and then determine whether the environment information needs to be provided to the user (step S1320). If yes, the user is alerted about the identification result through the output unit 130 (step S1331), and the identification result is transmitted back to the vehicle network (step S1330). If not, the identification result is canceled and the user is not notified (step S1332).

Figure 14:
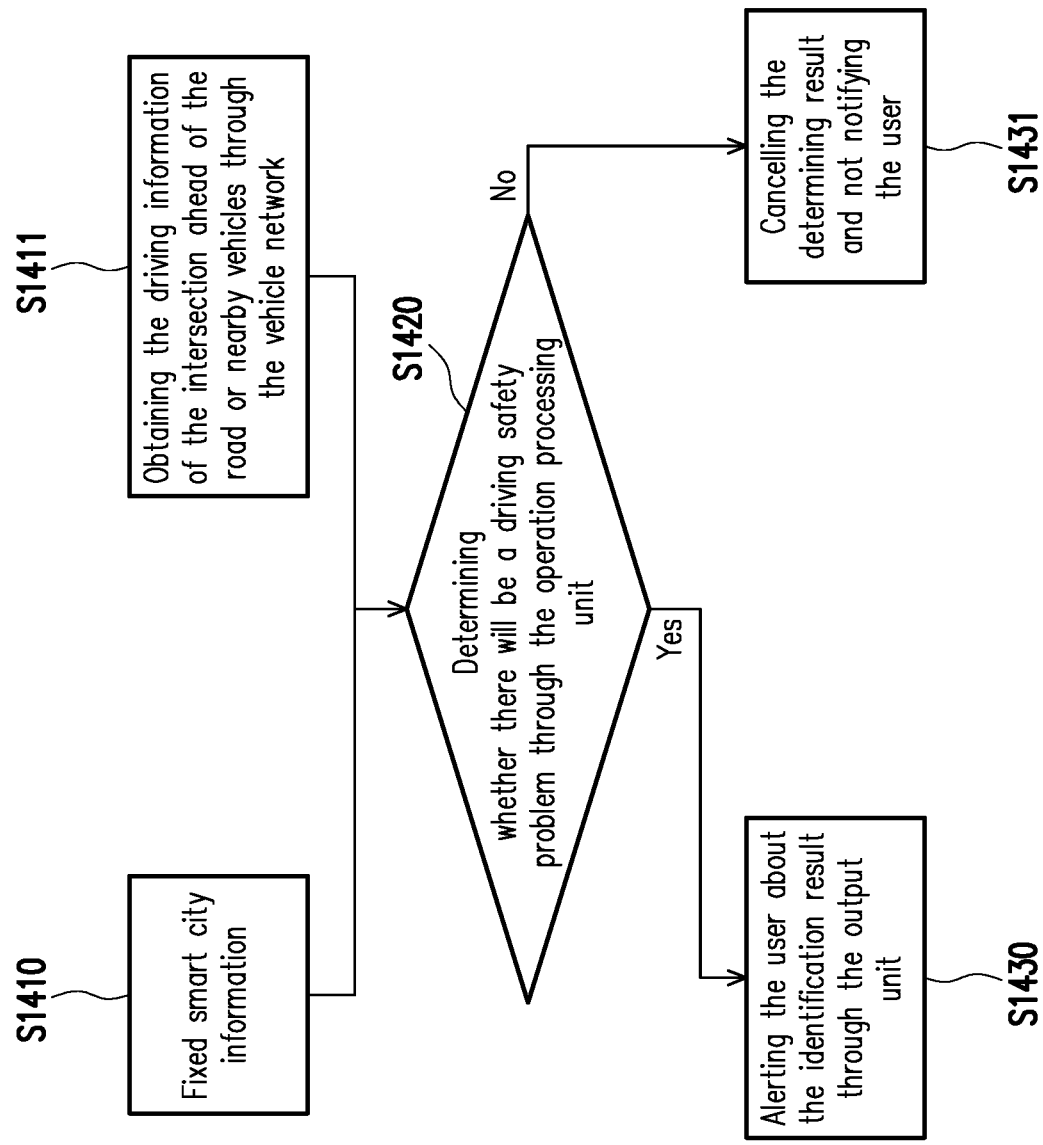
FIG. 14 is an exemplary flow chart illustrating applying an augmented reality display system in an embodiment of the disclosure to a fourth scenario.

FIG. 14 is an exemplary flow chart illustrating applying an augmented reality display system in an embodiment of the disclosure to a fourth scenario. Referring to FIG. 14, for example, it is a scenario where the augmented reality display system 100 can determine whether the output unit 130 needs to further remind the user through the operation processing unit 120 in the case where there is a construction ahead of the road or the road condition is poor. The input unit 110 can obtain the fixed smart city information through the signal receiving module 111 or the built-in database 112 (step S1410), or obtain the driving information regarding the intersection ahead of the road or nearby vehicles through the vehicle network (step S1411). Next, it is determined by the operation processing unit 120 whether there will be a driving safety problem (step S1420). If yes, the user is alerted about the identification result through output unit 130 (step S1430). If not, the determination result is canceled and the user is not notified (step S1431).

Figure 15:
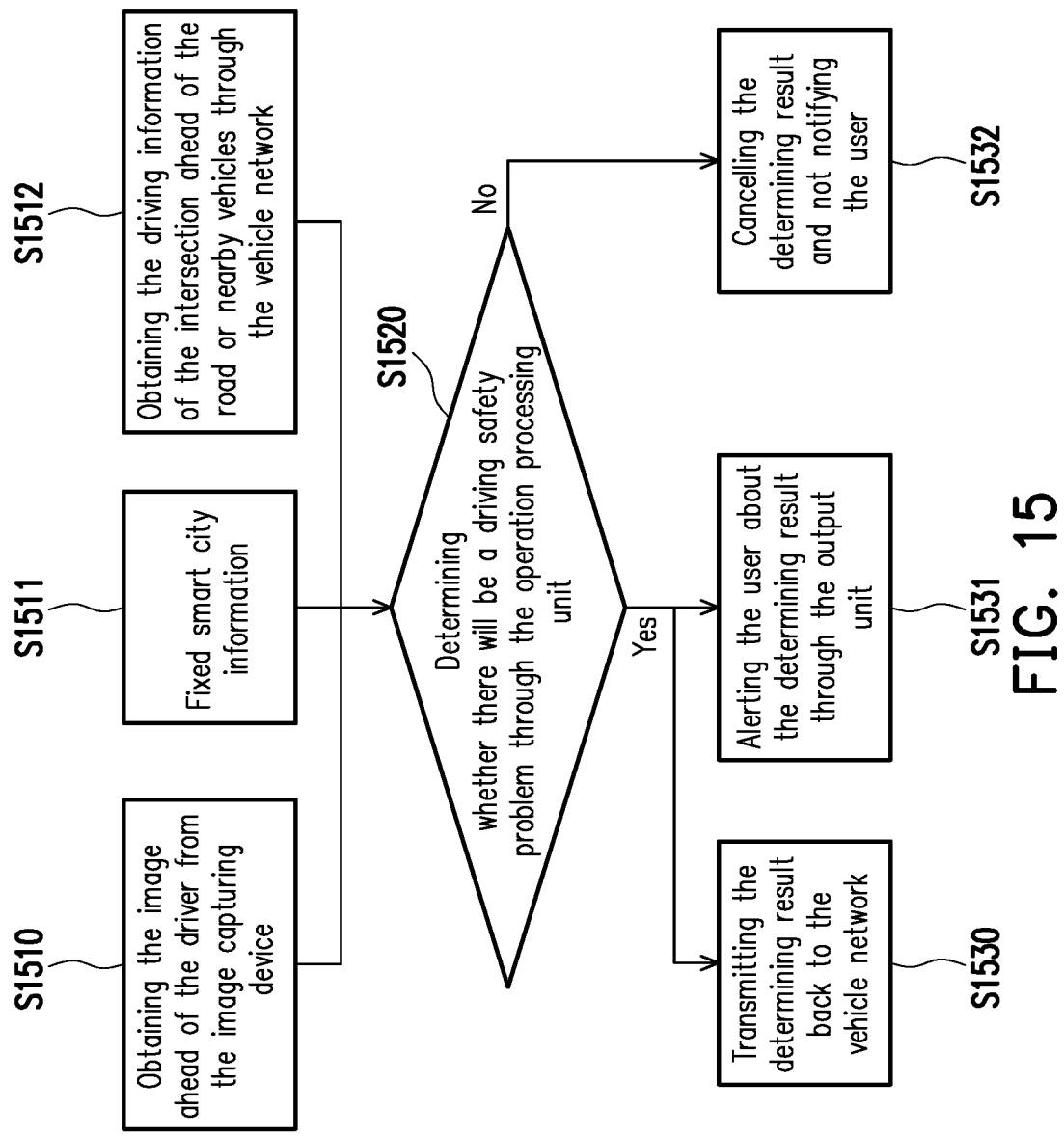
FIG. 15 is an exemplary flow chart illustrating applying an augmented reality display system in an embodiment of the disclosure to a fifth scenario.

FIG. 15 is an exemplary flow chart illustrating applying an augmented reality display system in an embodiment of the disclosure to a fifth scenario. Referring to FIG. 15, for example, it is a scenario where the augmented reality display system 100 can determine the subsequent car accident caused by obstacles on the driving route and other vehicles affecting the field of view through the operation processing unit 120. Therefore, the input unit 110 can obtain the image ahead of the driver through the image capturing device (step S1510), obtain the fixed smart city information through the signal receiving module 111 or the built-in database 112 (step S1511), or obtain the driving information regarding the intersection ahead of the road or nearby vehicles through the vehicle network (step S1512). Next, the operation processing unit 120 determines whether there will be a driving safety problem, and determines whether the environment information needs to be provided to the user (step S1520). If yes, the user is alerted about the determining result through the output unit 130 (step S1531), and the determining result is transmitted back to the vehicle network (step S1530). If not, the determining result is canceled and the user is not notified (step S1532).

In addition, in order to facilitate the use of the display module 140 of the output unit 130 of the embodiment of the disclosure, the display module 140 is disposed in the frame 180 (for example, shown in FIG. 3A and FIG. 3B) in the embodiment of the disclosure. Meanwhile, the display module 140 is disposed on the mask surface 710 or 810 of a carrier of the motorcycle helmet 700 in FIG. 7A or the sport helmet 800 in FIG. 8 through the frame 180. The specific implementation of disposing the frame on the carrier in the embodiment of the disclosure is described in details below.

Figure 16A:
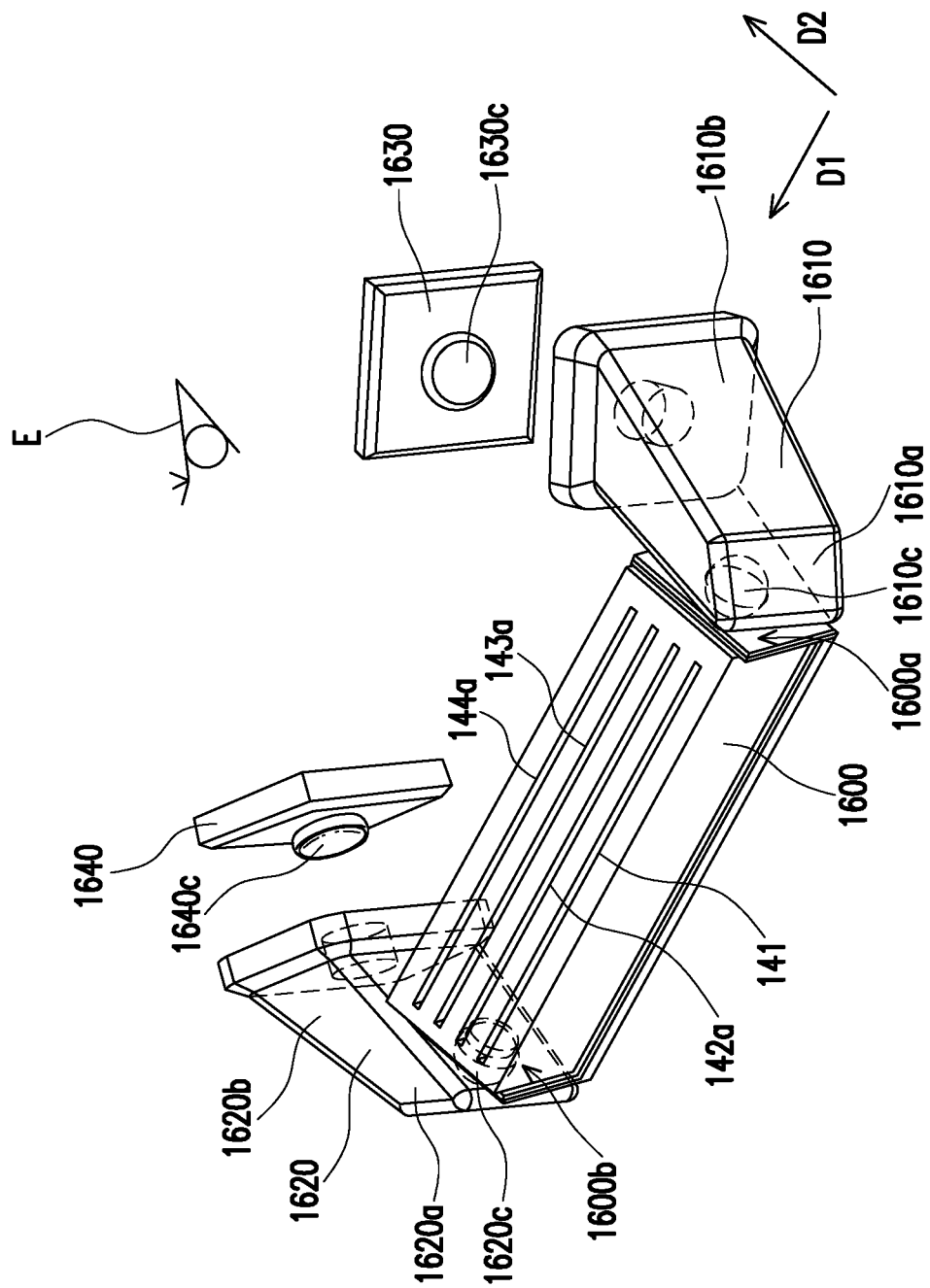
FIG. 16A is a perspective top view of a frame according to an embodiment of the disclosure.
Figure 16B:
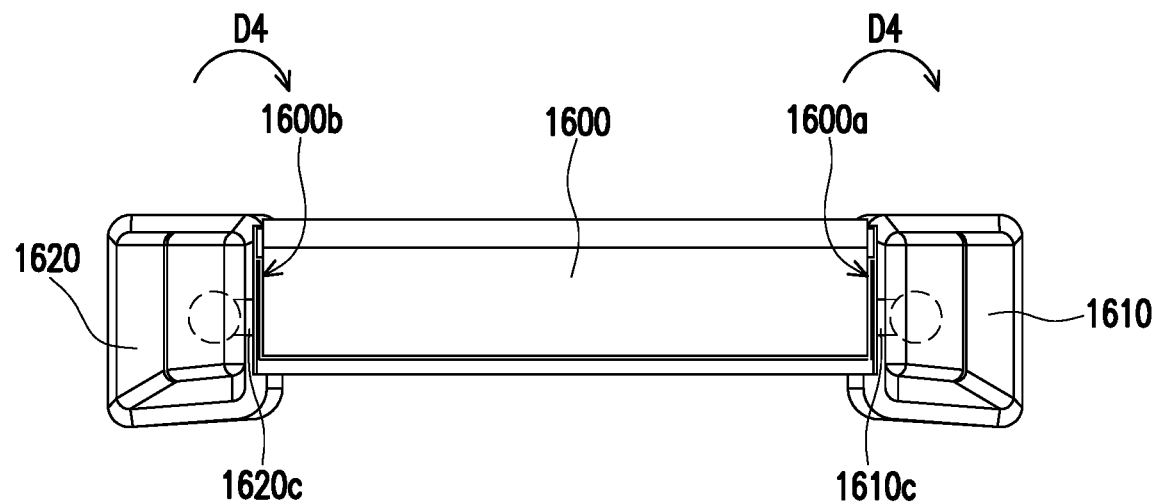
FIG. 16B to FIG. 16D respectively illustrate a front view, a right side view, and a top view of FIG. 16A.
Figure 16C:
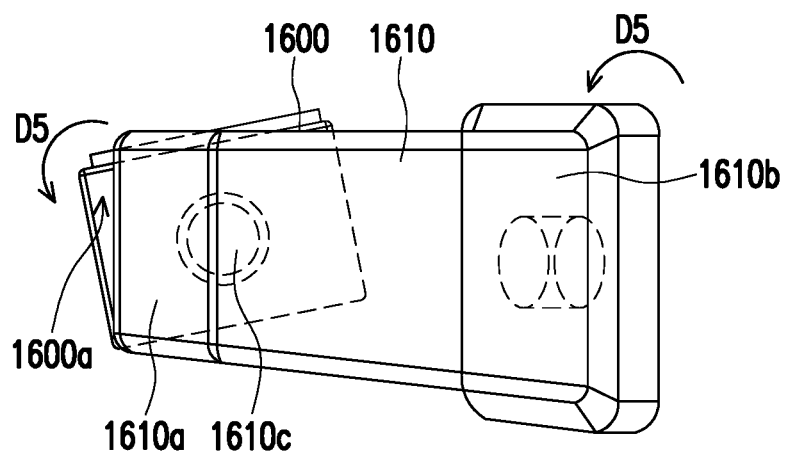
Figure 16D:
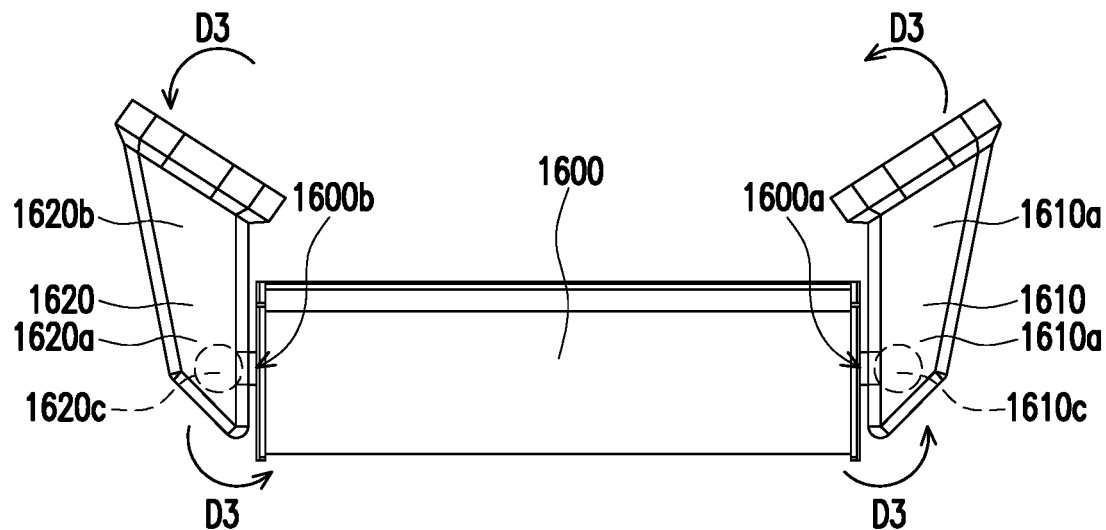
Figure 16E:
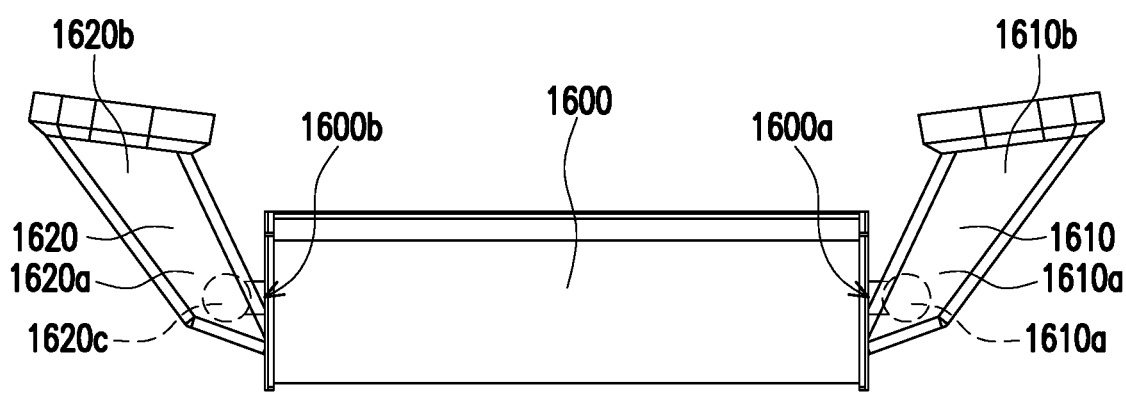
FIG. 16E is an example illustrating a first connector and a second connector of FIG. 16D rotated through a first joint and a second joint.

FIG. 16A is a perspective top view of a frame according to an embodiment of the disclosure. FIG. 16B to FIG. 16D respectively illustrate a front view, a right side view, and a top view of FIG. 16A. FIG. 16E is an example illustrating a first connector and a second connector of FIG. 16D rotated through a first joint and a second joint.

Referring to FIG. 16A to FIG. 16E, in the embodiment, the display module 140 of the output unit 130 further includes a frame 1600 such that the transparent display 141, the first lens 142*a*, the second lens 143*a*, and the third lens 144*a* are disposed in the frame 1600 along the arrangement direction D2.

In this embodiment, the display module 140 further includes a first connector 1610 and a second connector 1620. A first end 1610*a* of the first connector 1610 and a second end 1620*a* of the second connector 1620 are rotatably connected to opposite ends 1600*a* and 1600*b* of the frame 1600 through a first joint 1610*c* and a second joint 1620*c*, respectively. Meanwhile, a third end 1610*b* of the first connector 1610 and a fourth end 1620*b* of the second connector 1620 are rotatably connected to a first absorber 1630 and a second absorber 1640 through a third joint 1630*c* and a fourth joint 1640*c*, respectively. The frame 1600 is adsorbed to the surface of a carrier through the first absorber 1630 and the second absorber 1640. The carrier is, for example, the motorcycle helmet 700 in FIG. 7A or the sport helmet 800 in FIG. 8.

In the present embodiment, the first absorber 1630 and the second absorber 1640 are magnetic elements or suction cups.

In the present embodiment, the first joint 1610*c*, the second joint 1620*c*, the third joint 1630*c*, and a fourth joint 1640*c* are, for example, ball joints.

It should be noted that, in FIG. 16D, the direction in which the first joint 1610*c*, the second joint 1620*c*, the third joint 1630*c*, and the fourth joint 1640*c* are rotatable is only schematically indicated as the rotation direction D3, wherein the axis of the rotation direction D3 is perpendicular to the extending direction D1 and the arrangement direction D2, but the disclosure is not limited thereto. The first joint 1610*c*, the second joint 1620*c*, the third joint 1630*c*, and the fourth joint 1640*c* may further be rotated around the extending direction D1 or the arrangement direction D2 as the axis. For example, the axis of the rotation direction D4 shown in FIG. 16B is the arrangement direction D2, or the axis of the rotation direction D5 shown in FIG. 16C is the extending direction D1.

Figure 17A:
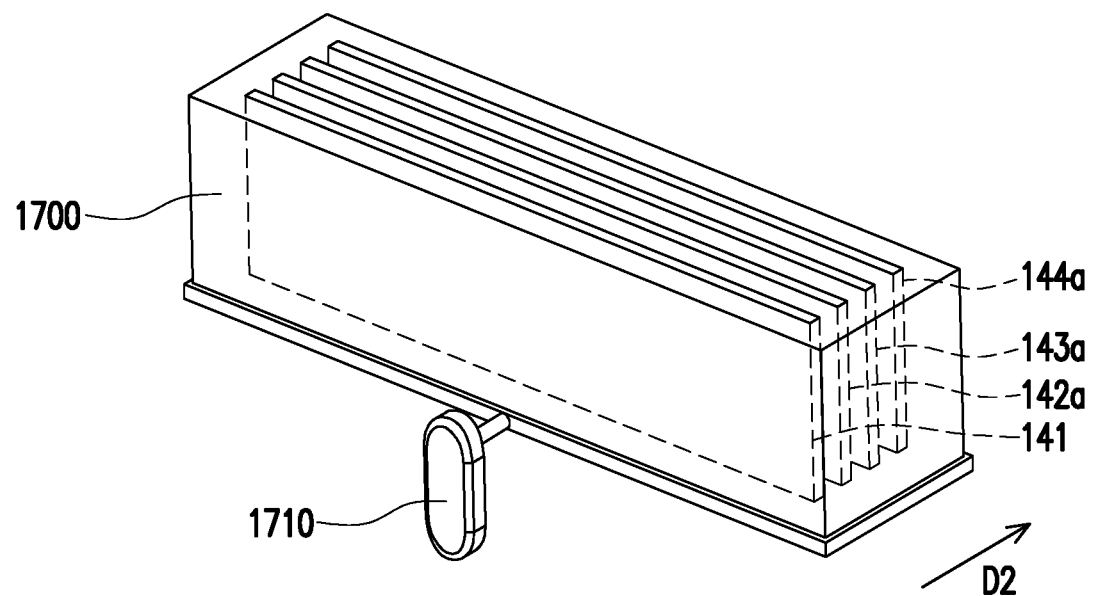
FIG. 17A is a perspective top view of another frame according to an embodiment of the disclosure.
Figure 17B:
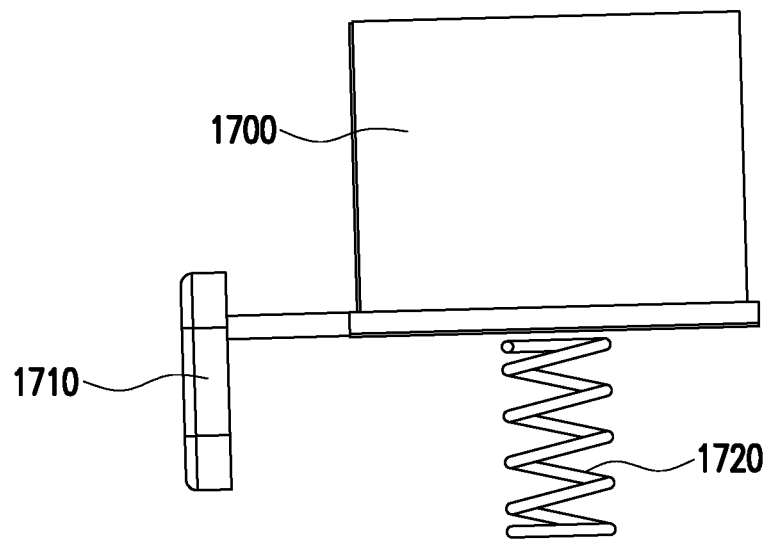
FIG. 17B is a right side view of FIG. 17A.
Figure 17C:
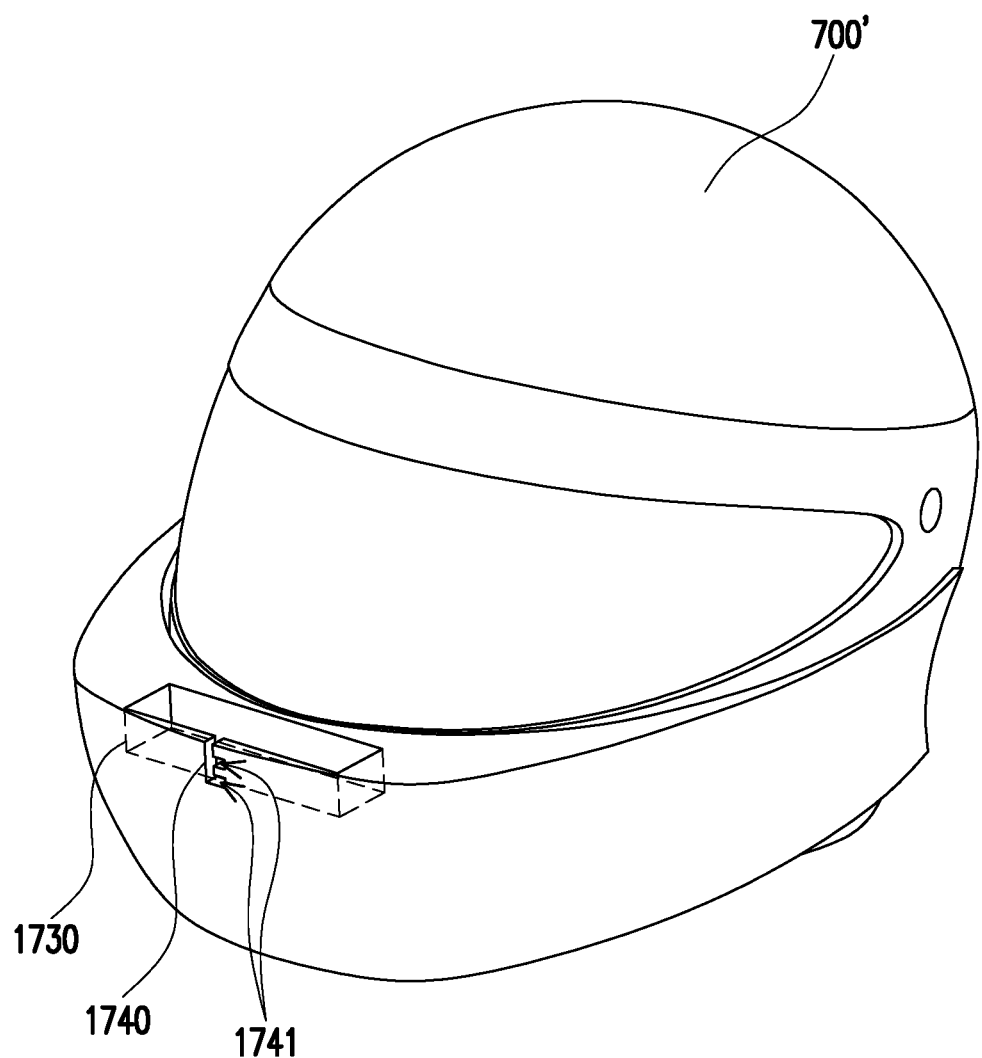
FIG. 17C is a schematic view of a carrier provided with a receiving portion according to an embodiment of the disclosure.
Figure 17D:
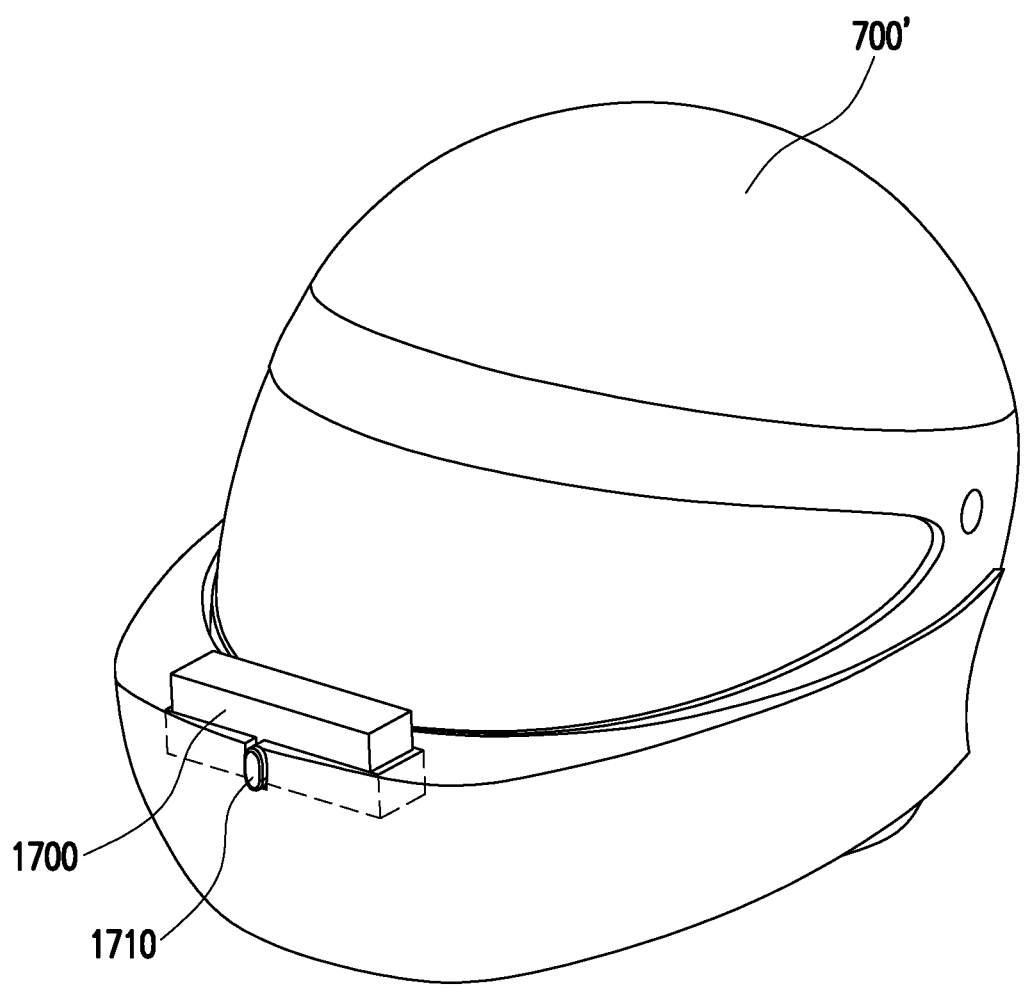
FIG. 17D is a schematic view illustrating the frame of FIG. 17A engaged with the carrier of FIG. 17C.

FIG. 17A is a perspective top view of another frame according to an embodiment of the disclosure. FIG. 17B is a right side view of FIG. 17A. FIG. 17C is a schematic view of a carrier provided with a receiving portion according to an embodiment of the disclosure. FIG. 17D is a schematic view illustrating the frame of FIG. 17A engaged with the carrier of FIG. 17C.

Referring to FIG. 17A-FIG. 17D, in the present embodiment, the augmented reality display system 100 further includes an elastic element 1720. The frame 1700 has a locking portion 1710, the frame 1700 makes the locking portion 1710 of the frame 1700 to be locked in at least one locking space 1741 on one side of a slideway 1740 after moving along the slideway 1740 through the locking portion 1710 and the slideway 1740 on the receiving portion 1730 of a carrier 700'. The frame 1700 makes the locking portion 1710 to be abutted in the at least one locking space 1741 through the elastic deformation force of the elastic element 1720 in the receiving portion 1730. For example, the lower end of the elastic element 1720 may be abutted against the lower wall of the receiving portion 1730, and the upper end of the elastic element 1720 may be abutted against the bottom of the frame 1700. Therefore, the elastic deformation force of the elastic element 1720 makes the locking portion 1710 to press the upper wall of the locking space 1741 to achieve a fixing effect.

In FIG. 17C, the receiving portion 1730 has two locking spaces 1741 to form an F-shaped slideway. However, the disclosure is not limited thereto, and it is possible to dispose only one locking space 1741, or a plurality of locking spaces 1741 may be provided depending other requirements of design.

In summary, the augmented reality display system and the transparent display of the augmented reality display method in the embodiment of the disclosure can provide a light beam corresponding to the output information, and the light beam is transmitted to the user's eyes through the first lens, the second lens, and the third lens to generate an augmented reality image. Therefore, the augmented reality display system and the augmented reality display method of the embodiments of the disclosure can reduce blocking of the user's field of view and provide the environment information to the user. Furthermore, not only that the environment information obtained by the input unit includes vehicle network information, but also the output unit can further transmit the environment information back to the vehicle network. In this manner, the latest vehicle network information is instantly available to users.

In addition, the augmented reality display system and the augmented reality display method of the embodiments of the disclosure can further provide the transparent display, the first lens, the second lens, and the third lens in the frame. The user can easily adsorb the frame to any surface of the carrier through the rotatability of the first joint, the second joint, the third joint and the fourth joint as well as the adsorptivity of the first absorber and the second absorber. Furthermore, the at least one display module has flexibility and is adapted to fit on the surface of the carrier in accordance with the curvature of the carrier. Therefore, the augmented reality display system and the augmented reality display method of the embodiments of the disclosure can reduce the uncomfortable sensation of the user when in use. Moreover, the augmented reality display system and the augmented reality display method of the embodiment of the disclosure can further lock the frame to the carrier by the locking portion through the slideway on the carrier. In this manner, the volume of the frame can be further reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An augmented reality display system, comprising:
an input unit, configured to obtain an environment information;
an operation processor, configured to operate and process the environment information provided by the input unit to generate an output information, wherein the operation processor determines a display sequence, a display size, a display brightness, and a display color of the output information according to an importance weight; and
an output unit, configured to transmit the output information provided by the operation processor to a user, the output unit comprising:
at least one display module, comprising a transparent display, a first lens having a negative refractive power, a second lens having a negative refractive power, and a third lens having a positive refractive power arranged in sequence from a display side to an eye side, wherein the first lens is disposed between the transparent display and the second lens; the second lens is disposed between the first lens and the third lens; the third lens is disposed between the second lens and an eye of the user,
wherein the transparent display of the at least one display module is configured to emit a light beam, and the light beam is incident into eyes of the user on the eye side through the first lens, the second lens and the third lens in sequence so that the eyes see an augmented reality image located on the display side, and light from a background penetrates through the transparent display, the first lens, the second lens, and the third lens in sequence, and is then transmitted to the eyes, and the transparent display is cemented to the first lens to form an optical component. and
wherein the output unit is disposed on a motorcycle helmet, and the output information comprises vehicle approach warning information, road warning information, intersection sign information, vehicle speed, engine speed, navigation information, inter-vehicle communication warnings of road and car conditions in vehicle network, weather information, time information, calls and mails display, information regarding Internet of Things, smart city sharing information or a combination thereof.

2. The augmented reality display system of claim 1, wherein the input unit comprises a signal receiving module, a built-in database, a sensing module, or a combination thereof.

3. The augmented reality display system of claim 1, wherein the output unit further comprises an information transmitter configured to provide the output information to a vehicle network.

4. The augmented reality display system of claim 1, wherein the first lens, the second lens or the third lens is a Fresnel lens.

5. The augmented reality display system of claim 1, wherein the at least one display module has flexibility.

6. The augmented reality display system of claim 1, wherein the input unit and the operation processor are disposed on a transportation vehicle.

7. The augmented reality display system of claim 1, wherein the input unit and the operation processor are disposed on a mobile device.

8. The augmented reality display system of claim 1, wherein the output unit further comprises a frame such that the transparent display, the first lens, the second lens, and the third lens are disposed within the frame along an arrangement direction.

9. The augmented reality display system of claim 8, further comprising:
a first connector; and
a second connector, wherein a first end of the first connector and a second end of the second connector are rotatably connected to opposite ends of the frame through a first joint and a second joint respectively, and a third end of the first connector and a fourth end of the second connector are rotatably connected to a first absorber and a second absorber through a third joint and a fourth joint respectively, wherein the frame is adsorbed on a surface of a carrier through the first absorber and the second absorber.

10. The augmented reality display system of claim 9, wherein the first absorber and the second absorber are magnetic elements or suction cups.

11. The augmented reality display system of claim 9, wherein the first joint, the second joint, the third joint, and the fourth joint are ball joints.

12. The augmented reality display system of claim 8, further comprising an elastic element, wherein the frame has a locking portion, the frame makes the locking portion of the frame to be locked in at least one locking space on one side of a slideway after moving along the slideway through the locking portion and the slideway on a receiving portion of a carrier, and the frame makes the locking portion to be abutted in the at least one locking space through an elastic deformation force of the elastic element in the receiving portion.

13. An augmented reality display method, comprising:
obtaining an environment information through an input unit;
transmitting the environment information to an operation processor;
operating and processing the environment information to generate an output information, wherein the operation processor determines a display sequence, a display size, a display brightness, and a display color of the output information according to an importance weight;
transmitting the output information to an output unit; and
providing the output information to a user, wherein the output unit provides a light beam corresponding to the output information through a transparent display, and the output unit transmits the light beam to eyes of the user through a first lens having a negative refractive power, a second lens having a negative refractive power and a third lens having a positive refractive power to generate an augmented reality image, wherein the transparent display, the first lens, the second lens, and the third lens are arranged in sequence from a display side to an eye side; the first lens is disposed between the transparent display and the second lens; the second lens is disposed between the first lens and the third lens; the third lens is disposed between the second lens and an eye of the user; light from a background penetrates through the transparent display, the first lens, the second lens, and the third lens in sequence, and is then transmitted to the eyes; the transparent display is cemented to the first lens to form an optical component;
wherein the output unit is disposed on a motorcycle helmet, and the output information comprises vehicle approach warning information, road warning information, intersection sign information, vehicle speed, engine speed, navigation information, inter-vehicle communication warnings of road and car conditions in vehicle network, weather information, time information, calls and mails display, information regarding Internet of Things, smart city sharing information or a combination thereof.

14. The augmented reality display method of claim 13, wherein the step of obtaining the environment information comprises:
  obtaining a receiving information through a signal receiving module;
  obtaining a sensing signal through a sensing module; and
  importing the receiving information and the sensing signal into a built-in database for comparison to obtain the environment information.

15. The augmented reality display method of claim 13, wherein the step of operating and processing the environment information to generate the output information comprises:
  determining whether the environment information needs to be provided to the user,
  if yes, determining an importance of the output information, and determining a display sequence, a display size, a display brightness, and a display color of the output information according to the importance weight, and transmitting the environment information back to a vehicle network through the output unit,
  if not, the environment information is not provided to the user.

16. The augmented reality display method of claim 15, wherein the output unit transmits the environment information back to the vehicle network through an information transmitter.

17. An augmented reality display system, comprising:
  an input unit, configured to obtain an environment information;
  an operation processor, configured to operate and process the environment information provided by the input unit to generate an output information, wherein the operation processor determines a display sequence, a display size, a display brightness, and a display color of the output information according to an importance weight; and
  an output unit, configured to transmit the output information provided by the operation processor to a user, the output unit comprising:
    at least one display module, comprising a transparent display, a first lens having a negative refractive power, a second lens having a negative refractive power, and a third lens having a positive refractive power arranged in sequence from a display side to an eye side, wherein the first lens is disposed between the transparent display and the second lens; the second lens is disposed between the first lens and the third lens; the third lens is disposed between the second lens and an eye of the user; each of the first lens and the second lens is a cylindrical Fresnel lens having a Fresnel surface having a plurality of strip teeth; the third lens is a cylindrical lens,
    wherein the transparent display of the at least one display module is configured to emit a light beam, and the light beam is incident into eyes of the user on the eye side through the first lens, the second lens and the third lens in sequence so that the eyes see an augmented reality image located on the display side, and light from a background penetrates through the transparent display, the first lens, the second lens, and the third lens in sequence, and is then transmitted to the eyes, and the transparent display is cemented to the first lens to form an optical component.

18. The augmented reality display system of claim 17, wherein the output unit is disposed on a sport helmet, and the output information comprises the user's physiological data, global positioning system (GPS) map information, sports information, weather information, time information, calls and mails display, information regarding Internet of Things or a combination thereof.

19. The augmented reality display system of claim 17, wherein the output unit is disposed on an industrial helmet, and the output information comprises a work station monitoring data, a working environment monitoring information, a time information, a calls and mails display, an industrial internet information or a combination thereof.

20. The augmented reality display system of claim 17, wherein the output unit is disposed on a telescope, and the output information comprises a GPS map information, a time information or a combination thereof.

* * * * *